United States Patent [19]

Dougherty et al.

[11] Patent Number: 5,488,283
[45] Date of Patent: Jan. 30, 1996

[54] VEHICLE BATTERY SYSTEM PROVIDING BATTERY BACK-UP AND OPPORTUNITY CHARGING

[75] Inventors: Thomas J. Dougherty, Waukesha; William J. Wruck, Shorewood; Richard J. Johnson, Hubertus, all of Wis.

[73] Assignee: Globe-Union, Inc., Milwaukee, Wis.

[21] Appl. No.: 128,453

[22] Filed: Sep. 28, 1993

[51] Int. Cl.[6] ............................ H01M 10/44; H02J 7/14; H02J 7/34; B60L 1/02
[52] U.S. Cl. ......................... 320/15; 320/19; 320/1; 307/66; 307/10.7
[58] Field of Search ......................... 320/1, 6, 8, 15, 320/19; 307/65, 66, 10.1, 10.7

[56] References Cited

U.S. PATENT DOCUMENTS

| | | | |
|---|---|---|---|
| 4,902,874 | 2/1990 | Tachimori et al. | 219/203 |
| 5,002,840 | 3/1991 | Klebenow et al. | 429/9 |
| 5,041,776 | 8/1991 | Shirata et al. | 320/1 |
| 5,055,656 | 10/1991 | Farah et al. | 219/209 |
| 5,162,720 | 11/1992 | Lambert | 320/6 |
| 5,204,610 | 4/1993 | Pierson et al. | 325/15 |
| 5,224,335 | 7/1993 | Yoshizaki | 60/300 |
| 5,260,637 | 11/1993 | Pizzi | 320/6 |
| 5,355,071 | 10/1994 | Ishida et al. | 320/6 |

*Primary Examiner*—Peter S. Wong
*Assistant Examiner*—Robert Nappi
*Attorney, Agent, or Firm*—Leonard J. Kalinowski; Edward L. Levine; Joseph E. Root, III

[57] ABSTRACT

A battery system for a vehicle includes a main battery for energizing the vehicle SLI circuits and an auxiliary battery for energizing the vehicle EHC system, the battery system providing back-up of the auxiliary battery by the main battery under certain conditions and back-up of the main battery by the auxiliary battery under certain other conditions, and the battery system providing opportunity charging of the auxiliary battery once the vehicle engine is running whereby the auxiliary battery shares the charging current with the main battery with the auxiliary battery being gradually connected to the source of charging current for the main battery by increasing the duty cycle of the drive circuit that connects the auxiliary battery to the source of charging current while monitoring the state of charge of the main battery and decreasing the duty cycle of the drive circuit to protect the main battery state of charge. In other embodiments, separate sources of charging current are provided for the auxiliary battery.

20 Claims, 16 Drawing Sheets

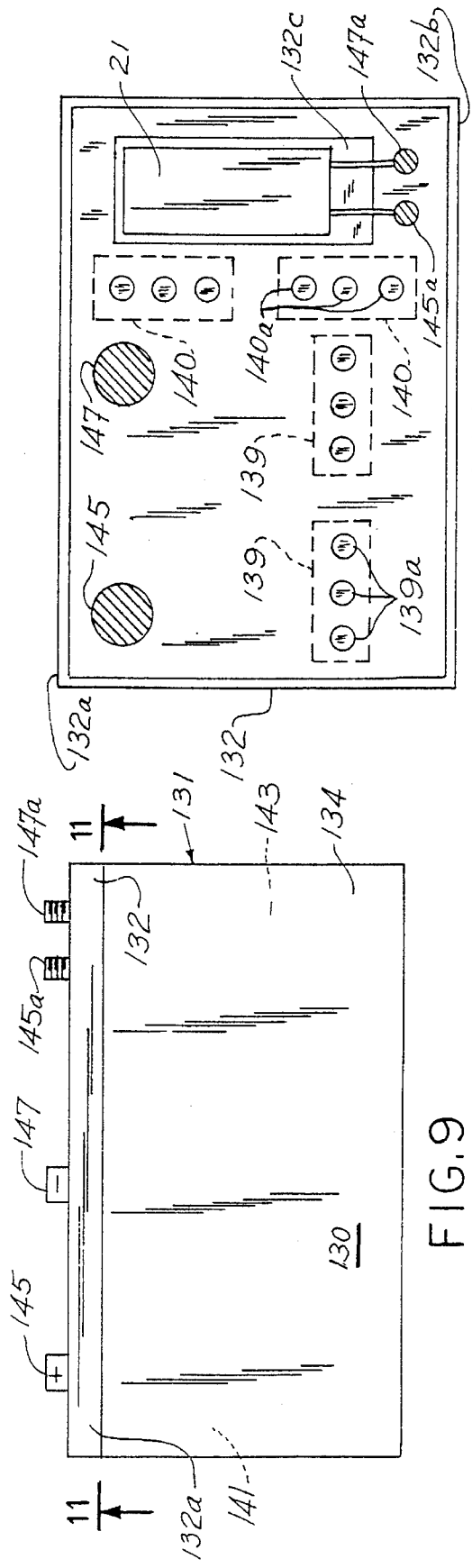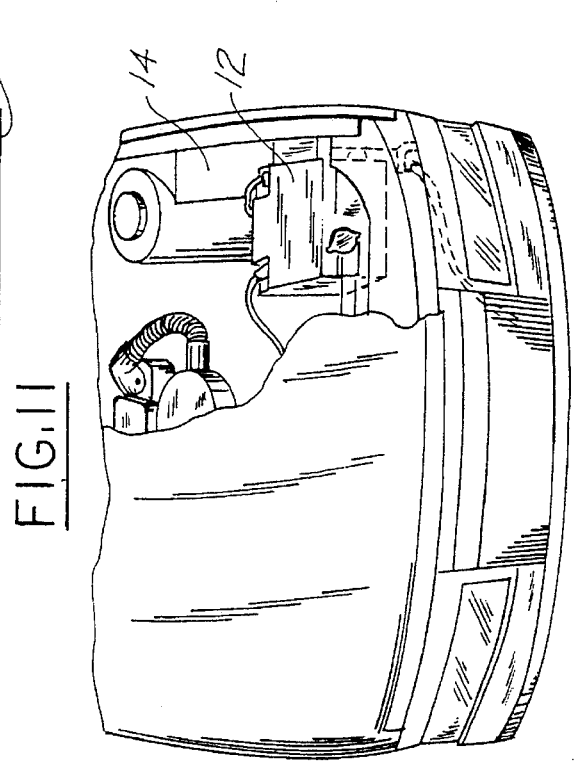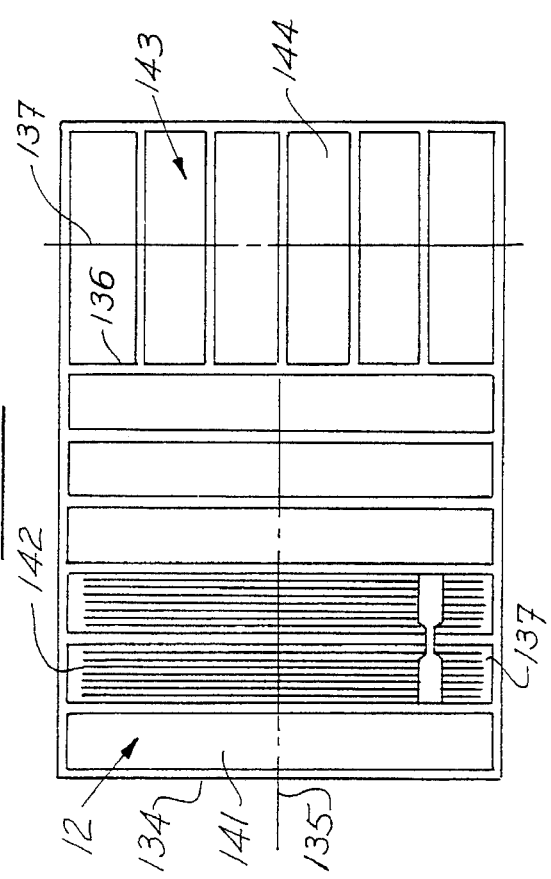

VEHICLE BATTERY SYSTEM PROVIDING BATTERY BACK-UP AND OPPORTUNITY CHARGING

BACKGROUND OF THE INVENTION

This invention relates to power supply systems including a rechargeable battery, and more particularly, to a vehicle battery system including a main battery and an auxiliary battery and which provides a battery back-up function and opportunity charging of the auxiliary battery.

Vehicle battery systems including a main battery and a reserve battery are known. One such battery system disclosed in U.S. Pat. No. 5,002,840 includes a main battery and a reserve battery disposed within a common housing. A unidirectional charging circuit connects the reserve battery in parallel with the main battery, permitting charging current to flow into the reserve battery, but preventing drain of the reserve battery during normal vehicle operation. When the main battery output is insufficient to start a vehicle, a switch is manually operated to connect the reserve battery in parallel with the main battery. The reserve battery provides sufficient power for the operator to start the vehicle. When the vehicle has been started, the switch is operated to disconnect the reserve battery from the starter circuit. The main battery is charged in a conventional manner and the reserve battery is recharged at a lower rate through the unidirectional current circuit.

An improved dual battery system is disclosed in U.S. Pat. No. 5,204,610 entitled Long Lived Dual Battery With Automatic Latching Switch, which issued on Apr. 20, 1993. This system, which is described with reference to the electrical system of a motor vehicle, includes a circuit for monitoring a parameter, such as primary battery voltage, of the main battery and for causing the reserve battery to be connected into the starting circuit when the primary battery voltage drops below a predetermined threshold value. In one embodiment of the system, the switching circuit is effective to connect the reserve battery into the starting circuit only when the primary battery voltage is below the preselected value prior to operating the ignition key to energize the starting circuit. In another embodiment, the switching circuit disconnects the reserve battery from the starting circuit when the ignition key is operated to the "ignition off" position, or after a preselected interval of time. The switching circuit includes a timing circuit to prevent the reserve battery from being discharged for an inordinately long period of time and to allow for its recharge. This arrangement obviates the need for operator intervention to manually operate a switch to activate the reserve battery system when required and to deactivate the reserve battery system when reserve power is no longer required.

A further consideration is the increasing demand on battery power for energizing vehicle accessories such as electrically heated catalytic converters, vehicle battery heaters, electric heaters for vehicle seats, windshield defrosters, and other non-critical accessories. Accessories of this type must be energized prior to or during the starting of the vehicle, this resulting in a significant drain on the main battery during the engine starting cycle, when maximum power is required.

For example, most gasoline-fueled vehicles in use today include a catalytic converter for reducing pollution. The catalytic converter may be heated electrically to optimize its performance. Power for heating the catalytic converter is obtained from the vehicle battery. Because the catalytic converter must be heated prior to or at the time of starting of the vehicle engine, a substantial electrical load is placed on the vehicle battery prior to, during or immediately after starting of the engine.

It is known that batteries charge less effectively and have reduced available power at lower temperatures. Consequently, various arrangements have been proposed for assuring a given battery temperature prior to starting of the vehicle. Most of the systems employ a heating element powered from the vehicle battery. Arrangements have been proposed whereby the battery is heated only when the battery voltage of the battery reaches a certain predetermined value which depends upon the battery's state of charge and on battery temperature. An example of a battery heating system employing a charge management strategy is disclosed in U.S. Pat. No. 5,055,656. These charge management strategies result in a greater average battery state of charge through increased charge acceptance and improved discharge performance resulting from increasing the temperature of the battery.

SUMMARY OF THE INVENTION

The present invention provides a battery system which includes a main battery and an auxiliary battery. The battery system is described with reference to an application for providing battery power for a vehicle in which the main battery is the conventional vehicle storage battery which energizes the starter motor, the lights and the ignition circuit of the vehicle, and the auxiliary battery is utilized to energize accessories of the vehicle, such as the vehicle electrically heated catalytic converter (EHC). Thus, the drain and wear on the main battery is limited because the EHC system has its own battery power source.

In accordance with the invention, the battery system provides a battery back-up function whereby the auxiliary battery is backed-up by the main battery under certain conditions and wherein the main battery is backed up by the auxiliary battery under certain conditions. Thus under normal operating conditions, wherein the engine has been started, if the auxiliary battery voltage is below a setpoint value, and if the state of charge of the main battery is sufficient to support backup of the auxiliary battery, then the main battery is connected in parallel with the auxiliary battery, for maintaining the EHC system energized. If the loading on the main battery becomes too severe, the main battery is disconnected from the auxiliary battery and a trouble indication is provided for alerting the operator of the vehicle to the trouble condition. Similarly, the main battery is backed up by the auxiliary battery under certain conditions, if the main battery is below a setpoint value.

In accordance with yet another aspect of the invention, the battery system provides opportunity charging of the auxiliary battery. Once the vehicle engine is running and the main battery is receiving charging current in the conventional manner, then under certain conditions, the auxiliary battery can share the charging current with the main battery to begin recharging of the auxiliary battery sooner. The auxiliary battery is gradually connected to the charging current for the main battery. For example, this can be accomplished by increasing the duty cycle of the drive circuit that connects the auxiliary battery to the source of charging current. If the auxiliary battery loading affects the main battery state of charge, the duty cycle is decreased until no further bad condition exists. In accordance with another embodiment, separate source of charging current is provided by for the auxiliary battery.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 9 is a front elevational view of a dual battery which may be used in the battery system provided by the present invention;

FIG. 10 is a top plan view of the container portion of the battery housing illustrating elements of the main and auxiliary batteries;

FIG. 11 is a plan view of the inside of the cover of the battery housing;

FIG. 12 is a simplified view of the front portion of an automobile, illustrating the auxiliary battery mounted separate from the main battery under the hood of the vehicle;

DESCRIPTION OF PREFERRED EMBODIMENTS

Figure 1:
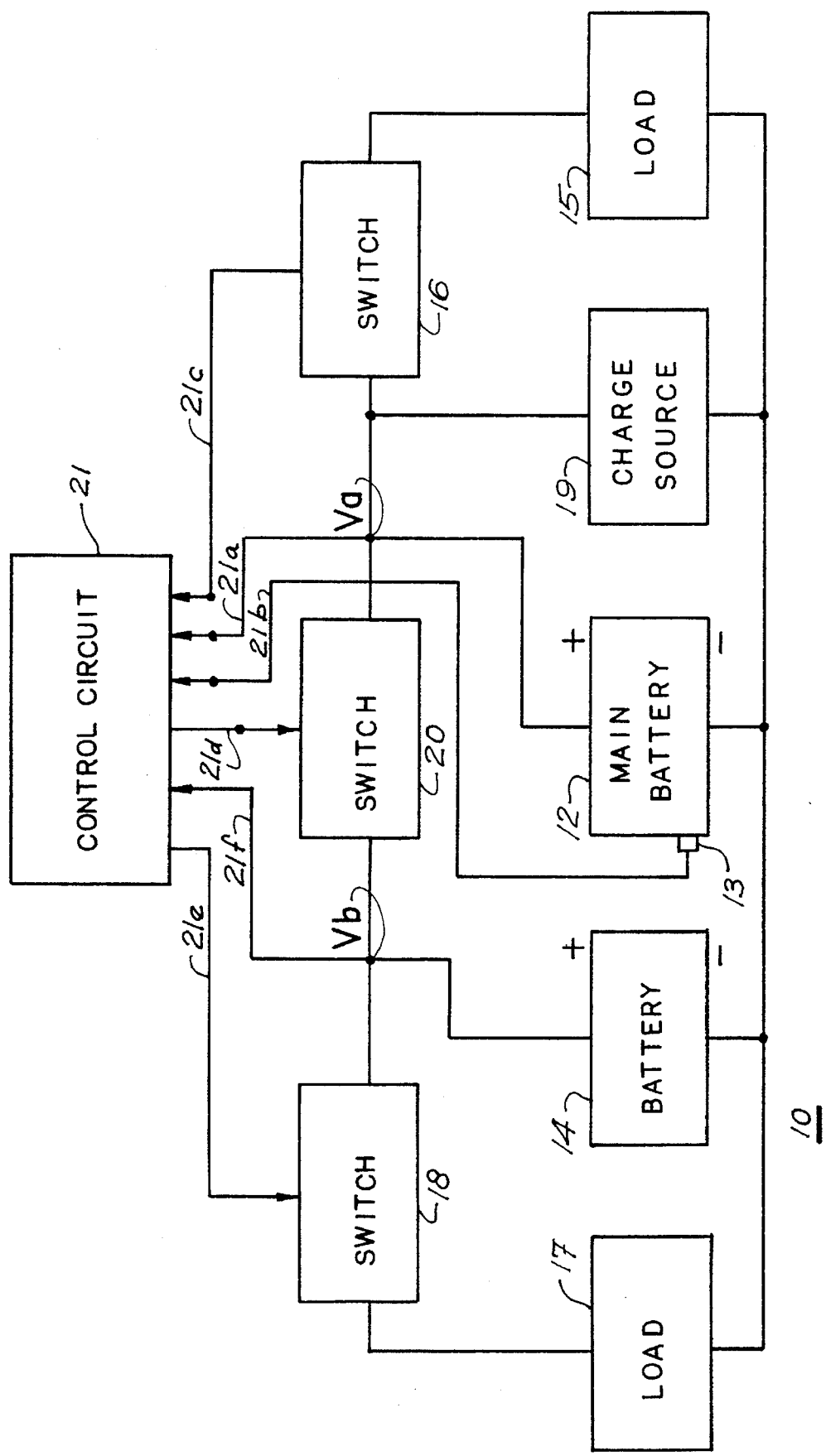
FIG. 1 is a block diagram of a battery system provided by the present invention which includes a main battery and an auxiliary battery.

Referring to the drawings, FIG. 1 is a block diagram of a battery system 10 provided by the present invention and which includes a main battery 12 and an auxiliary battery 14 for supplying power to respective loads 15 and 17. The main battery has its positive terminal connected between a node Va and its negative terminal connected to system ground. The main battery 12 is connected to the load 15 through a switch 16 to supply power to the load 15 whenever the switch 16 is operated. Similarly, the auxiliary battery 14 has its positive terminal connected to node Vb and its negative terminal connected to system ground. The auxiliary battery 14 is connected to the load 17 through a switch 18 whenever the switch 18 is operated.

The main battery 12 and the auxiliary battery 14 are rechargeable batteries. A source of charging current 19 is connected in parallel with the main battery 12 between node Va and system ground to supply charging current to the main battery 12. The auxiliary battery 14 also receives charging current from the source of charging current 19 whenever a switch 20 is operated.

A control circuit 21 controls the operation of switches 18 and 20 to connect the auxiliary battery 14 to the load 17 or to the source of charging current 19. The switches 18 and 20 are operated by the control circuit 21 as a function of one or more parameters of the main battery 12, such as the state of charge of the main battery, the ambient temperature around the main battery, or the amount of current being drawn from the main battery, for example. To this end, control circuit 21 has an input 21a connected to node Va to permit monitoring of the state of charge of the main battery as represented by the output voltage being produced by the battery 12. The control circuit 21 has a further input 21b connected to a sensor 13 to permit monitoring of the ambient temperature around the main battery. The control circuit 21 controls the switches 18 and 20 to insure that the auxiliary battery 14 is disconnected from the load 17 before being connected to the source of charging current 19 and is disconnected from the source of charging current 19 before being reconnected to the load 17.

By way of illustration, the battery system provided by the present invention is described with reference to an application in the electrical system for a vehicle. In such application, the main battery 12 provides power for energizing operating elements of the vehicle, such as the starter motor, lights and the ignition system, commonly referred to as the vehicle SLI system. The auxiliary battery 14 provides power for energizing accessories of the vehicle, such as the electrically heated catalytic converter (EHC), heaters for seats of the vehicle, the windshield defroster or heater, etc.

In addition, the auxiliary battery 14 acts as a back-up power source for the main battery 12, and the main battery acts as a back up power source for the auxiliary battery as a function of state of charge conditions of the two batteries and operating conditions of the battery system. For example, the auxiliary battery 14 is connected in parallel with the main battery 12 whenever the main battery voltage drops below a predetermined voltage level, such as 8.6 volts, on the first crank attempt or if the ambient temperature is less than a set value, such as −12° C. at the start of an ignition cycle. The main battery is connected in parallel with the auxiliary battery whenever the auxiliary battery voltage is less than a predetermined voltage, such as 8 volts, and the main battery voltage is at least 13 volts, for example. Other battery back-up operating criteria and embodiments of battery back-up control circuits are disclosed herein.

Vehicle Battery System

Figure 2:
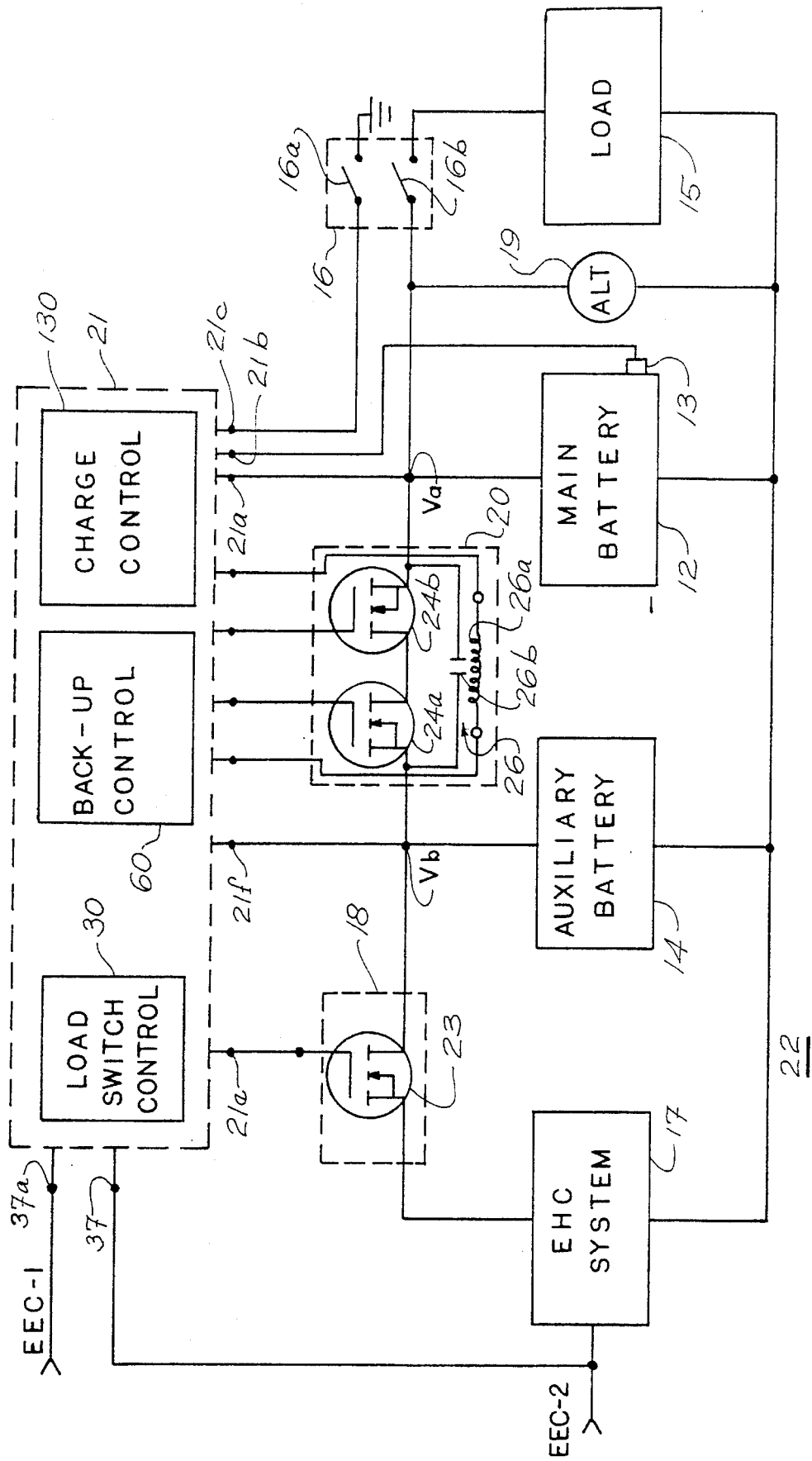
FIG. 2 is a block diagram of the battery system provided by the present invention in an application for supplying power to the electrical system of a vehicle.

Referring to FIG. 2, there is illustrated a battery system 22 which is employed in the electrical system of vehicle. In this embodiment, the load 15 is the vehicle SLI system including the starter motor, the lights, and the ignition system of the vehicle. The switch 16 is the key-operated ignition switch. The source of charging current 19 is the vehicle alternator. The auxiliary load 17 is the electrically heated catalytic converter system of the vehicle.

The control circuit 21 includes a load switch control circuit 30 which controls the switch 18, a battery back-up control circuit 60 which controls switches 18 and 20, and a charge control circuit 150 which controls switches 18 and 20. Switches 18 and 20 are low resistance type switching devices 23 and 24, embodied as field effect transistors FET 23, FET 24a and FET 24b for the embodiment illustrated in FIG. 2. Field effect transistors suitable for this application are power metal oxide silicon field effect transistors, such as an N-channel enhancement mode power FET for devices FET 23 and FET 24a, and a P-channel enhancement mode power FET for device FET 24b. By way of example, field effect transistors suitable for this application include the type RFP70N03 N-Channel power MOSFET, and its P-Channel counterpart, which are commercially available from Harris Semiconductor. The field effect transistors conduct unidirectionally when forward biased and conduct bidirectionally when gated on. The switching device 20 additionally includes a relay 26 having an operating winding 26a and one or more pair of contacts, such as contacts 26b. Contacts 26b are connected in parallel with series connected field effect transistors FET 24a and FET 24b. The operating winding 26a is connected to an output of the control circuit 21 and is operable independently of the field effect devices 24a and 24b. When closed, contacts 26b provide a low resistance path on the order of 1 to 3 milliohms between nodes Va and Vb.

Figure 3A:
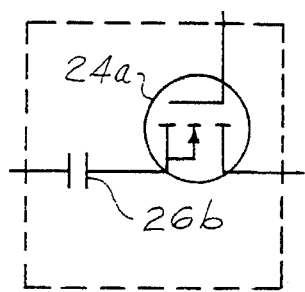
FIGS. 3A–3G illustrate further embodiments for the charge/back-up switch of the vehicle battery system illustrated in FIG. 2.
Figure 3B:
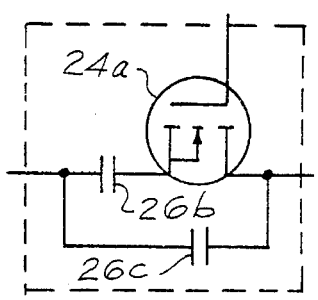
Figure 3C:
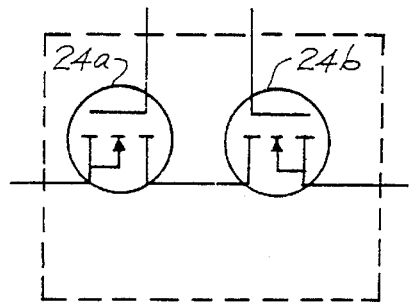
Figure 3D:
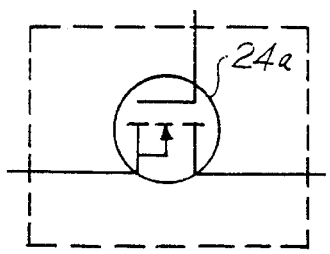
Figure 3E:
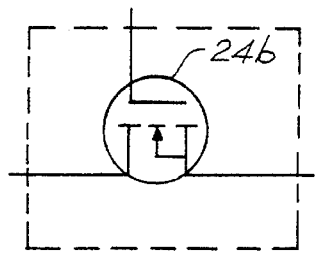
Figure 3F:
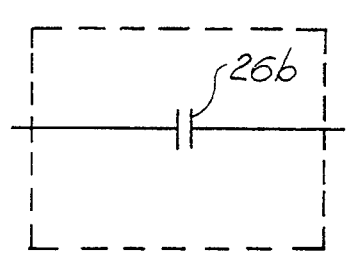
Figure 3G:
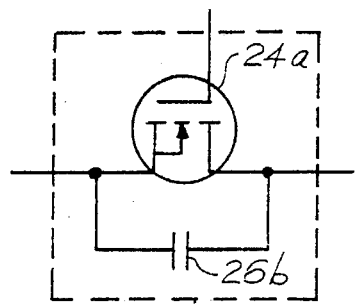

FIGS. 3A–3G illustrate further embodiments of the switch 20 of the vehicle battery system 22 illustrated in FIG. 2. In FIG. 3A, contacts 26b are connected in series with FET 24a, replacing FET 24b. In FIG. 3B, additional normally open contacts 26c are connected in parallel with series connected contacts 26b and FET 24a (FIG. 3A). The embodiment of FIG. 3C is similar to that of FIG. 2, but without contacts 26b. For the embodiments of FIGS. 3D, 3E, and 3F, switch 20 is a single element device FET 24a, FET 24b, and contacts 26b, respectively. In FIG. 3G, normally open contacts 26b are connected in parallel with FET 24a. The operating winding of the relay 26 is not shown is FIGS. 3A–3G.

In the embodiment illustrated in FIG. 2, the control circuit 21 and associated switching devices 23 and 24 are integrated into the vehicle electrical system. At startup, the load control circuit 30 connects the EHC system 17 to the auxiliary battery in response to a signal EEC-2 generated by the vehicle computer and indicating that the engine is running. The EHC system includes EHC control logic and a catalytic converter. The EHC control logic turns on the catalytic converter after it has been preheated to a certain temperature and maintains the catalytic converter "on" for a given time, period typically 10 to 45 seconds. When emissions are proper, the EHC control logic turns off the catalytic converter and the load switch control circuit 30 disconnects the EHC system 17 from the auxiliary battery. When the engine is running and certain conditions are met, the charge control circuit 150 operates switch 24 to connect the auxiliary battery 14 to the alternator 19 so that the auxiliary battery 14 receives charging current from the alternator 19.

Figure 4:
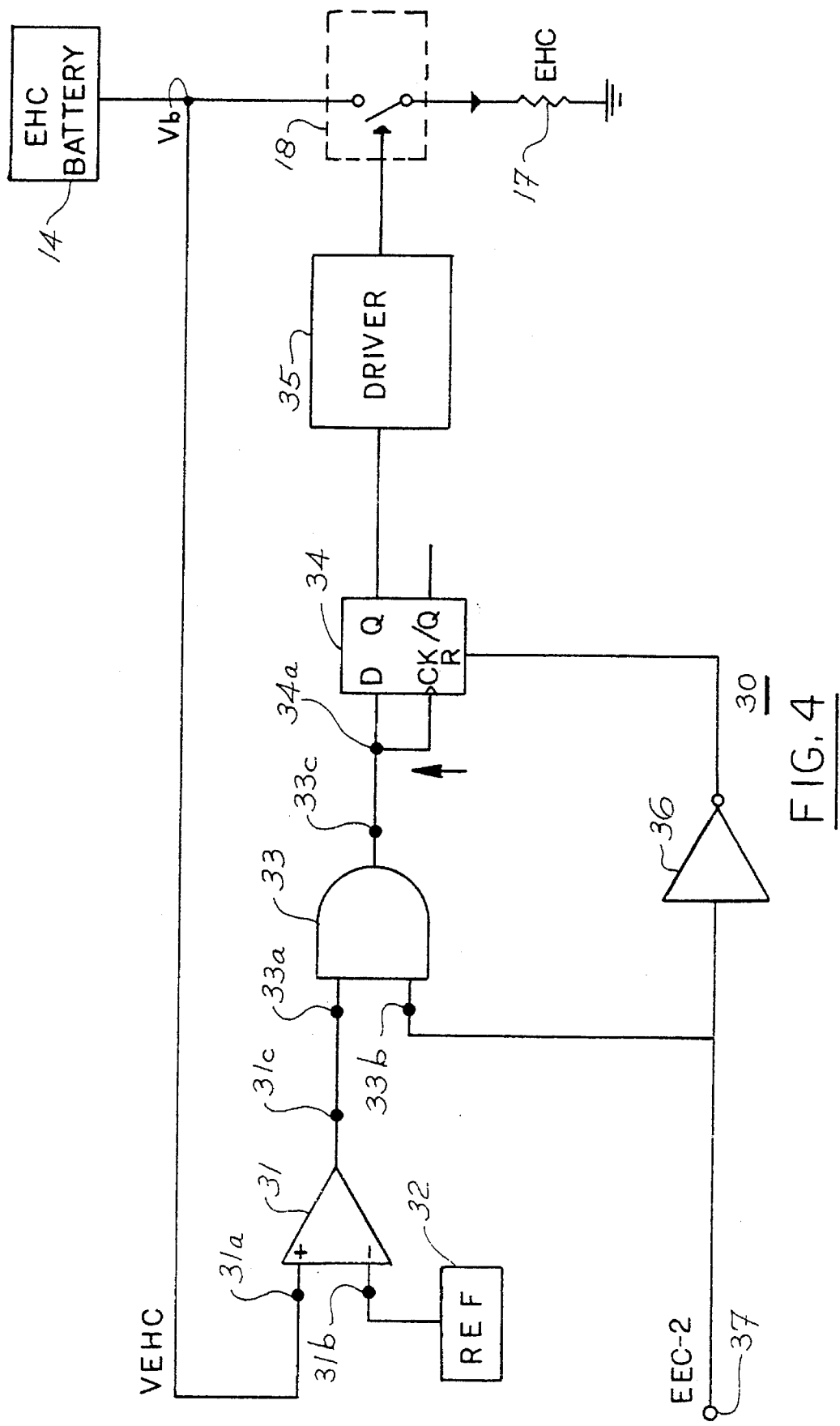
FIG. 4 is a block diagram of the load switch control circuit of the battery system shown in FIG. 2.
Figure 5:
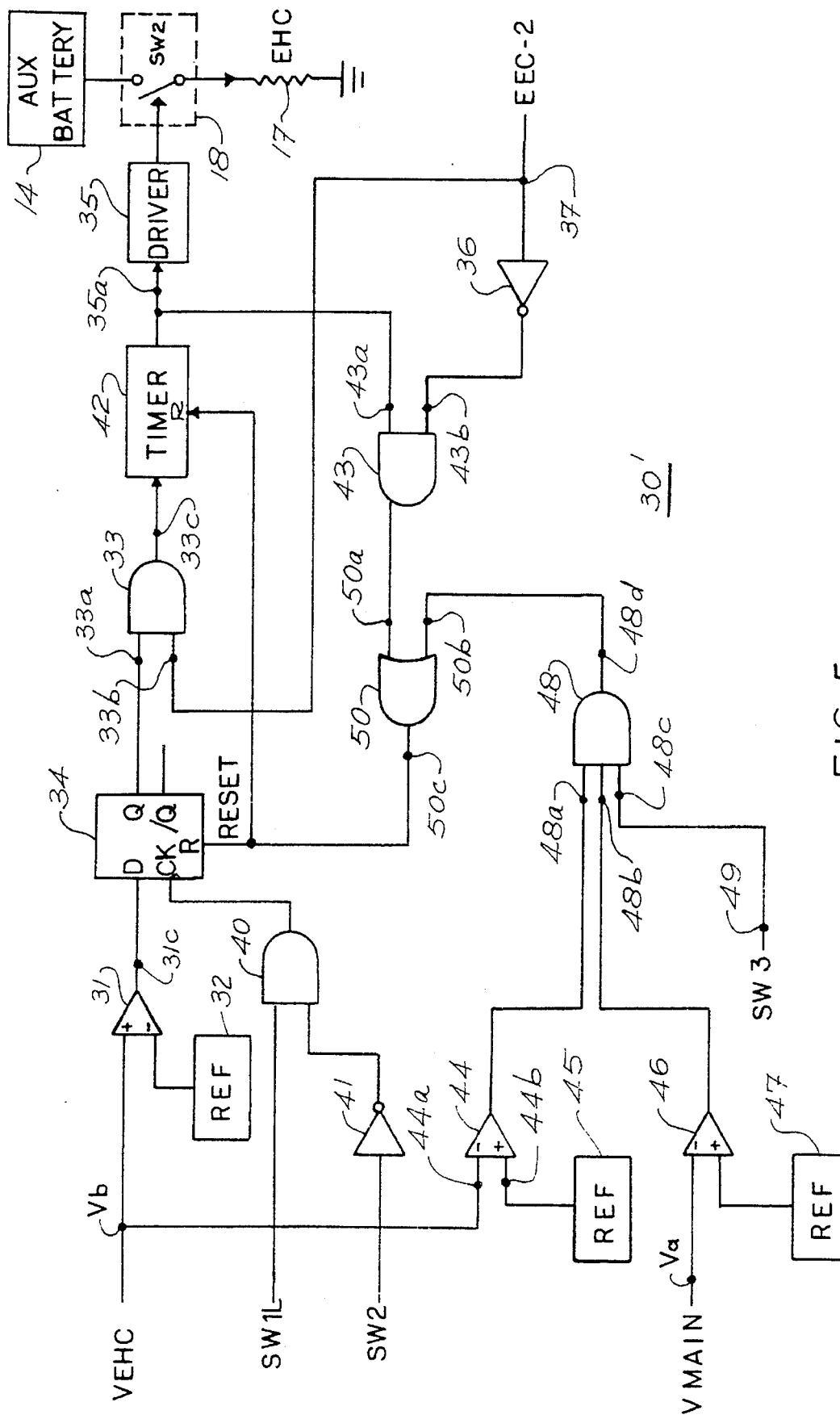
FIG. 5 is a block diagram of a further embodiment of the load switch control circuit shown in FIG. 2.

Load Switch Control Circuit (FIGS. 2, 4 and 5)

More specifically, before the vehicle engine is started, the control circuit 21 maintains FET 23 and FET 24 in their nonconducting conditions to isolate the auxiliary battery 14 from the EHC system 17 and the alternator 19. When the ignition switch 16 is operated to start the vehicle engine, the control circuit 21 senses the switch closure via its input 21c and the vehicle computer generated signal EEC-2, requesting activation of the EHC system, and operates FET 23 to its conducting state to connect the EHC system 17 to the auxiliary battery 14 for preheating the catalytic converter. Operation of the ignition switch 16 connects the main battery 12 to the starting motor of the SLI system 15. When the vehicle engine is started, the vehicle computer generates signal EEC-1. When emissions are proper, the catalytic converter EHC control logic terminates signal EEC-2 to operate FET 23 to its nonconducting state to disconnect the EHC system 17 from the auxiliary battery 14. Also, the alternator 19 is driven to recharge the main battery 12 in the conventional manner. As will be shown, the charge control circuit 150 controls switch 20 to connect the auxiliary battery 14 to the alternator 19 for recharging the auxiliary battery 14. In providing this function, the charge control circuit connects the auxiliary battery in parallel with the main battery, and thus to the alternator, as a function of one or more parameters of the main battery 12 so as to protect the state of charge of the main battery 12 and to ensure that the main battery is charged to a predetermined state of charge before permitting the auxiliary battery 14 to be connected to the charging source for the main battery.

Referring to FIG. 4, the load switch control circuit 30 connects the EHC system 17 to the auxiliary battery 14 when a signal EEC-2 is provided by the vehicle computer, but only if the voltage $V_{EHC}$ being provided by the auxiliary battery is greater than 12 volts. Signal EEC-2 is an engine computer signal requesting activation of the EHC system 17. The load switch control circuit 30 includes a signal comparator circuit 31 having an associated reference voltage source 32, an AND gate 33, a data latch 34, a drive circuit 35 and an inverter 36. The signal comparator circuit 31 has a positive input 31a connected at node Vb to the output of the auxiliary battery 14 and a negative input 31b connected to the output of the reference voltage source 32 which provides a 12 volt reference voltage. All open circuit voltage set point values, such as the reference voltage provided by reference voltage source 32, are temperature compensated at the rate of 1 millivolt per degree Celsius, beginning at 25° C.

The output 31c of the comparator circuit 31 is connected to one input 33a of AND gate 33 which has a second input 33b connected to a terminal 37 which is connected to an output of the vehicle computer to receive the signal EEC-2. The output 33c of the AND gate is commonly connected to the data input 34a and the clock input of the data latch 34. The true output of the data latch is connected to the input of the drive circuit, the output of which is connected to switch 18. The inverter 36 is connected between terminal 37 and the reset input of the data latch 34.

When signal EEC-2 is generated by the vehicle computer, the AND gate 33 is enabled if the voltage provided by the auxiliary battery 14 is greater than 12 volts. When AND gate 33 is enabled, the signal level at the output 33c of AND gate 33 becomes a logic high level, and this logic level is clocked to the true output of the data latch. The drive circuit 35 is enabled when the signal level at the true output becomes a logic high level, causing switch 18 to operate and connect the EHC system 17 to the auxiliary battery 14.

When the signal EEC-2 is terminated by the vehicle computer, the data latch 34 is reset and the true output of the data latch becomes a logic low level, disabling the drive circuit 35 to cause the switch 18 to disconnect the EHC system from the auxiliary battery.

Referring to FIG. 5, in accordance with a further embodiment of the load switch control circuit 30', the energization of the EHC system 17 is made dependent upon the vehicle engine being cranked. Additionally, the load switch control circuit 30' causes the EHC system 17 to be deenergized if the auxiliary battery voltage decreases below a set point level and the main battery cannot backup the auxiliary battery. The load switch control circuit 30' is similar to the load switch control circuit 30 and corresponding elements have been given the same reference numeral. The load switch control circuit 30' receives signals SW1L, SW2, SW3 and $V_{MAIN}$ in addition to signals EEC-2 and $V_{EHC}$. Signal SW1L is a signal indicating that the engine has been cranked at least once. Signal SW1L, once enabled, stays latched for two minutes. This signal is generated by detecting the closing of a grounded contact 16a of the key switch 16 (FIG. 2) and using this signal to start a timer. Signal SW2 is a signal indicating that the switch 18, which connects the EHC system to the auxiliary battery, is enabled. Signal SW3 is a signal indicating that switch 16, which connects the auxiliary battery in parallel with the main battery, is enabled. Signal $V_{MAIN}$ is the main battery voltage at node Va.

In switch control circuit 30', the output 31c of the comparator circuit 31 is connected directly to the data input of the data latch 34 and the clock signal for the data latch is generated by a two input AND gate 40 which combines signal SW1L and a signal provided at the output of inverter 41 that is the complement or inverse of signal SW2.

The true output of the data latch is connected to one input 33a of AND gate 33 which has a second input 33b connected to terminal 37 to receive signal EEC-2. The output 33c of AND gate 33 is connected to an input of a timing circuit 42, which provides a timing signal that is sixty seconds in duration. The output of the timing circuit 42 is connected to the input 35a of the drive circuit 35.

The output of the timing circuit 42 is connected also to one input 43a of a two input AND gate 43 which has its second input 43b connected to the output of inverter 36 which provides a signal that is the complement or inverse of signal EEC-2. The output 43c of AND gate 43 is connected to one input 50a of an OR gate 50 which has a second input 50b connected to the output of AND gate 48. The output 50c of OR gate 50 is connected to the reset inputs of the data latch 34 and of the timing circuit 42. The AND gate 43 is enabled, generating a reset signal which for the data latch 34, whenever signal EEC-2 becomes a logic low level during the sixty second time interval defined by the timing signal provided by the timing circuit.

A further reset signal for the data latch 34 is generated by a circuit including a comparator circuit 44 having an associated reference voltage source 45, a comparator circuit 46 having an associated reference voltage source 47 and a three input AND gate 48. Comparator circuit 44 has one input 44a connected to node Vb at the output of the auxiliary battery and a second input 44b connected to the reference voltage source 45 which provides a 6 volt, temperature compensated reference voltage. The signal output of the comparator circuit 44 is at a logic high level output whenever the auxiliary battery voltage is less than or equal to 6 volts. Comparator circuit 46 has one input 46a connected at node Va to the output of the main battery and a second input 46b connected to the reference voltage source 47 which provides a 9 volt, temperature compensated reference voltage. The signal output of the comparator circuit 46 is at a logic high level output whenever the main battery voltage is less than or equal to 9 volts. The signal outputs of the comparator circuits 44 and 46 are connected to respective inputs 48a and 48b of AND gate 48 which has a third input 48c connected to terminal 49 to receive signal SW3 which is at a logic high level whenever the switch 20 is enabled, i.e., when the auxiliary battery is being backed up by the main battery as will be described. The output 48d of AND gate 48 is connected to input 50b of OR gate 50.

For the purpose of illustration of the operation of the load control circuit 30', it is assumed that the auxiliary battery voltage is greater than 12 volts and that the main battery voltage is greater than 9 volts so that the output of comparator circuit 31 is at a logic high level and the outputs of comparator circuits 44 and 46 are at a logic low level. Also, the drive circuit 35 is disabled so that signal SW2 is at a logic low level and its complement is at a logic high level, priming AND gate 40.

When the engine is cranked, signal SW1L becomes a logic high level, enabling AND gate 40 which produces a signal which clocks the logic high level at the output of comparator circuit 31 to the output of the data latch 34, priming AND gate 33. Accordingly, AND gate 33 is enabled when signal EEC-2 becomes a logic high level. When AND gate 33 is enabled, the timing circuit 42 provides a logic high level timing signal which is sixty seconds in duration. The timing signal enables the drive circuit 35, causing switch 18 to operate and connect the EHC system 17 to the auxiliary battery 14. In addition, the timing signal provided by the timing circuit 42 primes AND gate 43. The signal provided by the comparator circuit 31, which is indicative of the level of the auxiliary battery voltage, is latched in the data latch 34. Accordingly, the drive circuit 35 remains energized for the duration of the timing signal, even if the auxiliary battery voltage decreases to or below 12 volts, but not lower than 6 volts, when the auxiliary battery is loaded by the EHC system 17.

When emissions are proper, the signal EEC-2 is terminated by the vehicle computer when emissions are proper. When the signal EEC-2 is terminated, AND gate 43 is enabled and its output becomes a logic high level, enabling OR gate 50 which provides a reset signal for the data latch 34 and for the timing circuit 42. When the timing circuit 42 is reset, the drive circuit 35 is disabled, causing the switch 18 to disconnect the EHC system from the auxiliary battery. If the timing circuit 42 times out before the signal EEC-2 terminates, drive circuit 35 is disabled, causing the switch 18 to disconnect the EHC system from the auxiliary battery.

Under a battery back-up condition, when either the auxiliary battery is backed up by the main battery or vice versa, switch 20 is operated so that signal SW3 is at a logic high level, providing a logic high level at input 48c of AND gate 48. If the auxiliary battery voltage decreases to or below 6 volts and if the main battery voltage decreases to or below 9 volts, the signals at the outputs of the comparator circuits 44 and 46 become logic high levels, enabling AND gate 48. When AND gate 48 is enabled, OR gate 50 is enabled, providing a reset signal for the data latch 34 and the timing circuit 42. When the timing circuit 42 is reset, the drive circuit 35 is disabled, causing the switch 18 to disconnect the EHC system 17 from the auxiliary battery.

Battery Back-up Circuit (FIGS. 2 and 6–8)

Further in accordance with the invention, if when the engine is started as signalled by signal EEC-1, the auxiliary battery voltage is below a predetermined voltage level, the battery back-up switch control circuit 60 operates switch 20 to connect the main battery in parallel with the auxiliary battery 14 so that the auxiliary battery is backed up by the main battery. Similarly, if, at start-up, the main battery voltage is below a predetermined voltage level, or decreases below the predetermined voltage level on the first crank attempt, or if the ambient temperature is less than a setpoint value such as −12° C., then the auxiliary battery 14 is utilized as a back-up power source for the main battery 12. The control circuit 21 monitors the main battery voltage appearing at node Va and if the voltage at node Va is less than the predetermined amount at the time the ignition switch 16 is closed, the battery back-up control circuit 60 operates switch 20 to connect the auxiliary battery 14 in parallel with the main battery 12.

Figure 6:
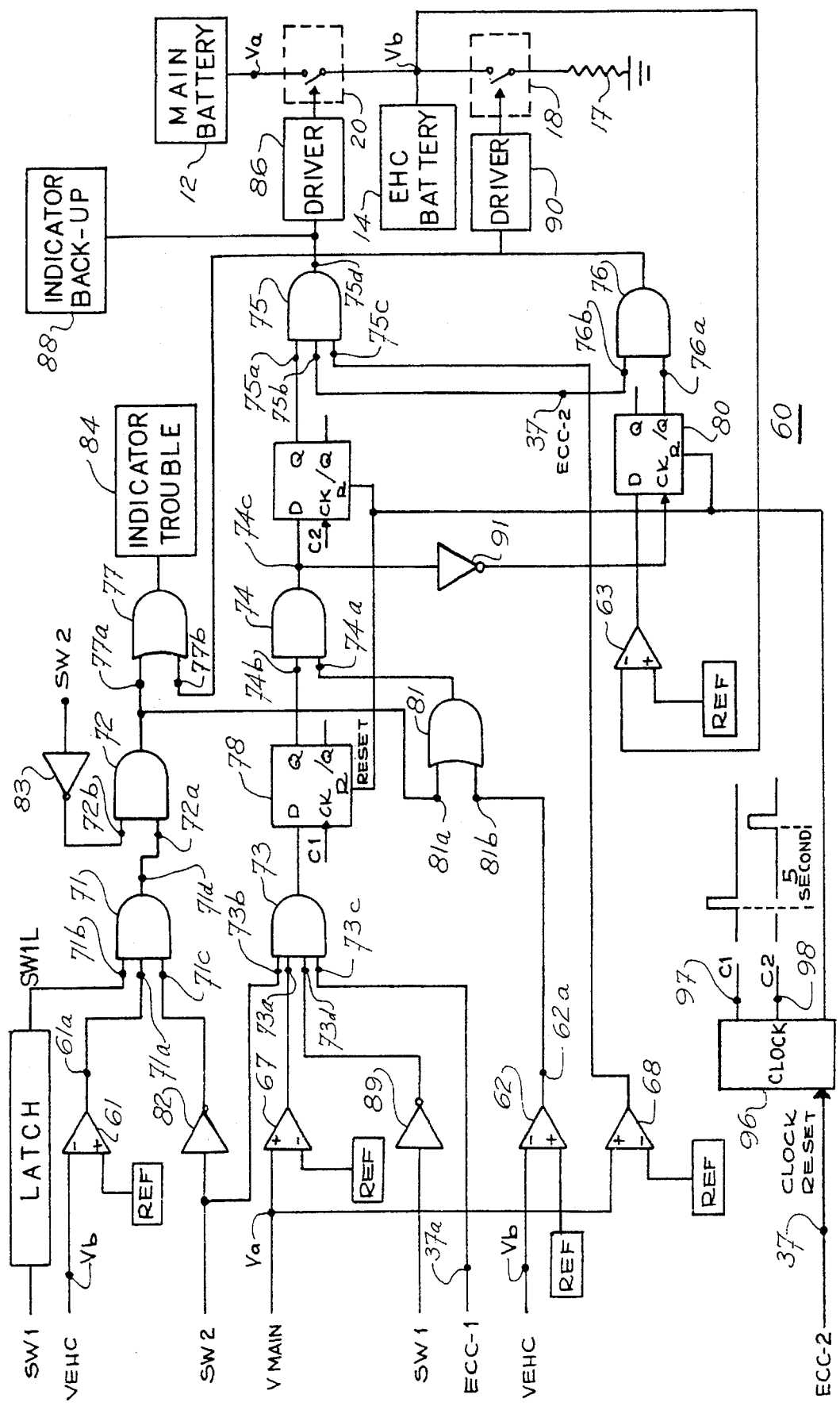
FIG. 6 is a block diagram of the battery back-up switch control circuit of the battery system shown in FIG. 2 which provides back-up of the auxiliary battery.

Referring to FIG. 6, there is illustrated one embodiment of the battery back-up switch control circuit 60 which controls the back up of the auxiliary battery 14 by the main battery 12 under certain operating conditions. The auxiliary battery is connected in parallel with the main battery only when such connection is not detrimental to the operation of the vehicle. For example, the back up of the auxiliary battery by the main battery is precluded during start-up of the engine by requiring that the engine has been started and is currently running. Moreover, the back up of the auxiliary battery by the main battery is prevented whenever the main battery voltage is below a preselected value.

The switch control circuit 60 includes comparator circuits 61, 62 and 63, having inputs connected to the output of the auxiliary battery at node Vb, which provide outputs indicative of the state of charge of the auxiliary battery, and comparator circuits 67 and 68, having inputs connected to the output of the main battery at anode Va, which provide outputs indicative of the state of charge of the main battery. The switch control circuit 60 further includes AND gates 71–76, OR gates 77 and 81 and data latch circuits 78–80 which respond to the signals provided by the comparator circuits to enable a drive circuit 86 to control switch 20 to cause the auxiliary battery to be connected in parallel with the main battery when conditions warrant. All open circuit voltage set point values are temperature compensated at the rate of I millivolt per degree Celsius, starting at 25 degrees Celsius.

The switch control circuit 60 includes a trouble indicator 84 and a back-up enabled indicator 88. The trouble indicator 84 and the back-up enabled indicator 88 each includes an indicating device, such as a light emitting diode, a light or other indicator, which is mounted on the vehicle dashboard in a location to be seen by the operator of the vehicle. The trouble indicator 84 and the back-up enabled indicator 88 may include a drive circuit for maintaining the indicating device steady on or flashing, depending on the condition being indicated. The trouble indicator 84 provides an indication that a trouble condition exists, such as the auxiliary battery being discharged below an acceptable limit or the main battery state of charge being insufficient to back up the auxiliary battery. The back-up enabled indicator 88 provides an indication that the auxiliary battery is being backed up by the main battery or that the auxiliary battery is backing up the main battery.

Considering the switch control circuit 60 in more detail, the output 61a of comparator circuit 61 is connected to an input 71a of AND gate 71 which has a second input 71b connected to receive signal SW1L and a third input 71c connected to the output of inverter 82 which provides a signal corresponding to the inverse or complement of signal SW2. The output 71d of gate 71 is connected an input 72a of AND gate 72 which has a second input 72b connected to the output of an inverter 83 which is at a logic high level whenever signal SW2 is at a logic low level or in its false state, indicative that switch 18 is not enabled and so the auxiliary battery is not loaded. The output of AND gate 72 is connected to an input 77a of OR gate 77 and to an input 81a of OR gate 81. The output of OR gate 77 is connected to the input of the trouble indicator 84.

The output 62a of comparator circuit 62 is connected to a second input 81b of OR gate 81, the output of which is connected to an input 74a of AND gate 74. The AND gate 74 has a second input 74b connected to the true output of the data latch 78. The output 74c of gate 74 is connected to the data input of data latch 79, the true output of which is connected to one input 75a of AND gate 75. The AND gate 75 has a second input 75b connected to terminal 37 to receive signal EEC-2 and a third input 75c connected to the output of comparator circuit 68. The output 75d of AND gate 75 is commonly connected to the input of a drive circuit 86 for the switch 20 and to the back-up enabled indicator 88.

The output of comparator circuit 63 is connected to the data input of data latch 80 which has its false output connected to one input 76a of AND gate 76. A second input 76b of AND gate 76 is connected to terminal 37 to receive signal EEC-2. The output of AND gate 76 is connected to the drive circuit for the switch 18 and to input 77b of OR gate 77. The output of AND gate 74 is connected through inverter 91 to the clock input of data latch 80.

The output of comparator circuit 67 is connected to one input 73a of AND gate 73 which has a second input 73b connected to receive signal SW2 and a third input 73c connected to terminal 37a receive signal EEC-1. A fourth input 73d of gate 73 is connected to the output of an inverter 89 to receive a signal which is the inverse or false state of signal SW1 which is true whenever the engine is being cranked. Signal SW1 is generated by a ground contact 16a (FIG. 2) on the starting switch 16. The output of AND gate 73 is connected to the data input of data latch 78 which has its true output connected to input 74b of gate 74. The output of comparator circuit 68 is connected to input 75c of AND gate 75.

For the purpose of synchronizing the operation of the back-up switch control circuit 60, a clock circuit 96 provides a clock signal C1 on output 97 and a clock signal C2 on output 98. Clock signal C2 is delayed five seconds relative to clock signal C1. The clock signal C1 is applied to the clock input of data latch 78. Clock signal C2 is applied to the clock input of data latch 79. The signal EEC-2 provides a reset signal for the clock circuit 96 and for resetting the data latch circuits 78, 79 and 80 when the signal transitions from a logic low to a logic high level.

In operation of the battery back-up switch control circuit 60, the state of charge of the auxiliary battery is sensed before back up of the auxiliary battery is provided by the main battery. This is done to determine whether or not the auxiliary battery is bad or is in a low discharge state before connecting the EHC system to by auxiliary battery. Comparator circuits 61, 62 and 63 continuously monitor the voltage provided by the auxiliary battery. The signal level at the output of comparator circuit 61 is at a logic high level whenever the auxiliary battery voltage $V_{EHC}$ is less than 12 volts. The signal level at the output of comparator circuit 62 is at a logic high level whenever the auxiliary battery voltage $V_{EHC}$ is less than 8 volts. The signal level at the output of comparator circuit 63 is at a logic high level whenever the auxiliary battery voltage $V_{EHC}$ is less than a set point value which is designated as "N" volts.

AND gate 71 is enabled when the output of comparator circuit 61 is at a logic high level, signal SW1L is at a logic high level, and the complement of signal SW2 is at a logic high level. The output of the comparator circuit 61 is at a logic high level whenever the auxiliary battery voltage $V_{EHC}$ is less than 12 volts under a no load condition, this is indicative that the auxiliary battery is in a low discharge state and cannot hold a charge. Initially, the EHC system 17 is not connected to the auxiliary battery so that signal SW2 is at a logic low level and its complement or inverse is at a logic high level. That is, the auxiliary battery is not loaded and is under an open circuit condition. When AND gate 71 is enabled, AND gate 72 is enabled because the output of inverter 83 is at a logic high level. When the output of AND gate 72 becomes a logic high level, OR gate 77 is enabled and its output sets the trouble indicator 84 to its "on" state, providing an indication to the operator of the vehicle that the auxiliary battery is in a low discharge state and cannot hold a charge.

When switch 18 is enabled to connect the EHC system 17 to the auxiliary battery, the auxiliary battery will be backed up by the main battery if the auxiliary battery voltage becomes less than 8 volts, provided that the main battery voltage is greater than 13 volts. As has been indicated in the description of the EHC load control circuit 30 illustrated in FIG. 5, for example, the EHC system 17 is connected to the auxiliary battery only when the engine is running and is no longer being cranked. For such conditions, signal EEC-1 is at a logic high level and signal SW1 is at a logic low level so that inputs 73c and 73d of AND gate 73 are at logic high levels..

The signal level at the output of comparator circuit 67 is at a logic high level whenever the main battery voltage $V_{MAIN}$ is greater than 13 volts so that input 73a of AND gate 73 is at a logic high level. When the vehicle computer generates signal EEC-2, causing switch 18 to operate and connect the EHC system 17 to the auxiliary battery as described above with reference to FIG. 5, for example, signal SW2 becomes a logic high level, providing a logic high level at input 73b of AND gate 73. Moreover, when signal SW2 becomes a logic high level, AND gate 72 is disabled, causing the indicator 84 to be disabled or turned off. When the AND gate 73 is enabled, the signal at the data input of data latch 78 becomes a logic high level. When the vehicle computer generates signal EEC-2, requesting energization of the EHC system, the clock signal generating circuit 96 is reset and generates clock signal C1 which clocks the logic high signal level at the data input of the data latch 78 to the true output of the data latch, providing a logic high level at input 74b of AND gate 74.

The signal EEC-2 "primes" AND gates 75 and 76 to follow the signals applied to their other inputs by respective data latches 79 and 80. Thus, if the auxiliary battery voltage decreases below 8 volts while the EHC system is connected to the auxiliary battery, the output of comparator circuit 62 becomes a logic high level, requesting back-up of the auxiliary battery by the main battery. When the output of comparator circuit becomes a logic high level, OR gate 81 is enabled and its output becomes a logic high level, enabling AND gate 74, the output of which is connected to the data input of data latch 79. Additionally, when the main battery voltage $V_{MAIN}$ is greater than 9 volts, indicating that the main battery state of charge is sufficiently high to back up the auxiliary battery, the signal level at the output of comparator circuit 68 is at a logic high level, providing a logic high level at input 75c of AND gate 75, permitting gate 75 to follow the output of the data latch 79.

Five seconds after clock signal C1 is generated, the clock signal generating circuit 96 generates clock signal C2 which clocks the logic high signal level at the data input of the data latch 79 to the true output of the data latch 79. When the true output of data latch 79 becomes a logic high level, AND gate 75 is enabled, enabling drive circuit 86. Drive circuit 86 operates switch 20 to connect the auxiliary battery in parallel with the main battery. When AND gate 75 is enabled, the back-up enabled indicator 88 is enabled, providing an indication to the operator of the vehicle that the battery back-up function has been enabled. The foregoing condition where the auxiliary battery is backed up by the main battery, both switches 18 and 20 are operated, is the exception to the general rule that when the EHC load is connected to the auxiliary battery, the auxiliary battery is not connected to the main battery. However, under these conditions, the main battery has sufficient charge to provide the back up the auxiliary battery. Moreover, the battery back-up circuit includes provision for disconnecting the main battery from the auxiliary battery and for disconnecting the EHC load from the auxiliary battery if continued auxiliary battery back-up and/or continued energization of the EHC system would be detrimental to operation of the vehicle.

If the voltage being provided by the main battery decreases to or below 9 volts while the main battery is backing up the auxiliary battery, the output of comparator circuit 68 becomes a logic low level, disabling AND gate 75. When AND gate 75 is disabled, drive circuit 86 is disabled, causing switch 20 to disconnect the auxiliary battery from the main battery. Also, the back-up enabled indicator 88 is disabled so that the operator of the vehicle is alerted to the fact that battery back-up function has been disabled. Comparator circuit 63, latch circuit 80 control AND gate 76 to cause the EHC load to be disconnected from the auxiliary battery if the auxiliary battery voltage decreases below a preselected voltage level "N" volts when the auxiliary battery is disconnected from the main batten,/by disabling switch 18. The trouble indicator 84 is enabled to indicate the trouble condition.

Under normal operating conditions, when the vehicle computer terminates signal EEC-2, the drive circuit 86 is disabled to disable switch 20 to disconnect the auxiliary battery from the main battery and the drive circuit 90 is disabled to disable switch 18 to disconnect the EHC system 17 from the auxiliary battery. In addition, the back-up enabled indicator 88 is disabled. The signal EEC-1 can be used to reset the battery back-up switch control circuit 60 to initial conditions when signal EEC-1 becomes a logic low level when the vehicle engine is shut off.

Figure 7:
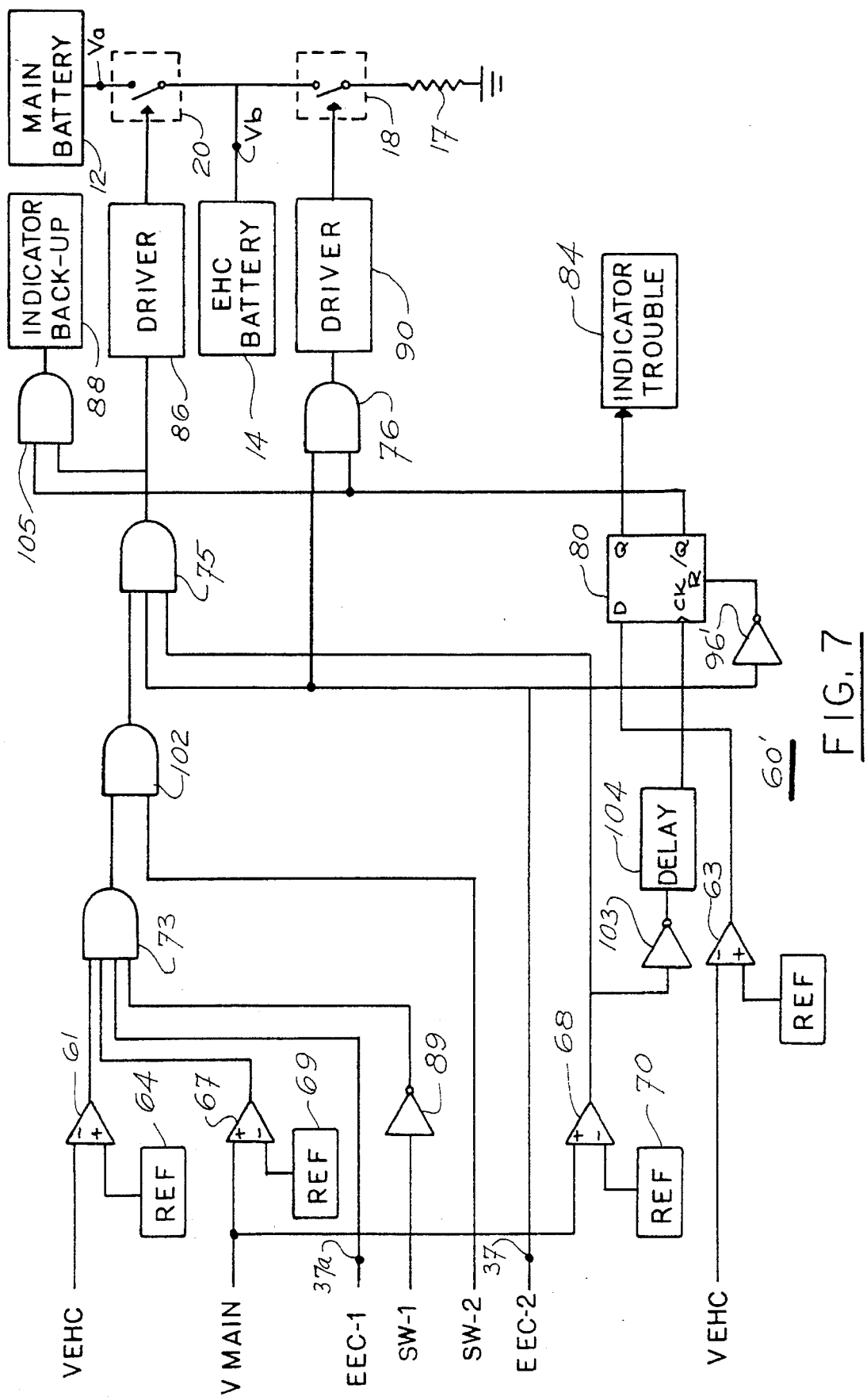
FIG. 7 is a block diagram of a further embodiment of the battery back-up switch control circuit shown in FIG. 2 which provides back-up of the auxiliary battery.

Referring to FIG. 7, there is illustrated a further embodiment of the back-up switch control circuit 60'. The switch control circuit 60' is similar to the switch control circuit 60 of FIG. 6, and accordingly, like circuit elements have been given the same reference numerals. In the switch control circuit 60', the battery voltage monitoring circuits are enabled in response to values of the main battery and the auxiliary battery which are expressed as a percentage of the maximum voltage values which provided by the main battery and the auxiliary battery. For example, the output of comparator circuit 61 is at a logic high level when the auxiliary battery voltage is greater than 60% of its maximum value. The output of comparator circuit 67 is at a logic high level when the main battery voltage is greater than 70% of its maximum value.

Initially, before, the request for activating the EHC system is provided, the latch circuit 80 is held reset so that its false output is at a logic high level, priming AND gates 76 and 105. When signal EEC-2 is provided by the vehicle computer, AND gate 76 is enabled, generating signal SW2 at a logic high level for enabling drive circuit 90 which, in turn, enables switch 18, connecting the EHC system 17 to the auxiliary battery.

The signal outputs of comparator circuits 61 and 67 are combined by AND gate 73 with signals EEC-1 and the complement of signal SW1. The signal EEC-1 and the complement of signal SW1 are at a logic high level when the engine is running and is not being cranked. Under such conditions, if the auxiliary battery voltage is greater than 60% of its maximum value and the main battery voltage is greater than 70% of its maximum value, AND gate 73 is enabled which in turn enables AND gate 102 if the EHC system is connected to the auxiliary battery, i.e., when signal SW2 is at a logic high level.

Assuming initially that the main battery voltage is greater than 9 volts so that the output of the comparator circuit 68 is at a logic high level, then when signal EEC-2 is provided, AND gate 75 is enabled, enabling drive circuit 86. In addition, AND gate 105 is enabled, enabling the back-up enabled indicator 88. When drive circuit 86 is enabled, switch 20 is enabled, connecting the auxiliary battery in parallel with the main battery.

If the main battery voltage $V_{MAIN}$ subsequently decreases to 9 volts or less, the output of comparator circuit 68 becomes a logic low level, disabling AND gate 75 to cause drive circuit 86 to disable switch 20 and disconnect the auxiliary battery from the main battery. In addition, the back-up condition enabled indicator 88 is disabled.

When the vehicle computer terminates signal EEC-2, the AND gate 75 is disabled, disabling the drive circuit 86, which in turn disables switch 20, disconnecting the auxiliary battery from the main battery. In addition, AND gate 76 is disabled, causing drive circuit 90 to disable switch 18, disconnecting the EHC system 17 from the auxiliary battery.

If, after the main battery has been disconnected from the auxiliary battery, the auxiliary battery voltage $V_{EHC}$ decreases below a value that is less than a set point value, which is designated as "N" volts, then the output of comparator circuit 63 becomes a logic high level. This signal level is applied to the data input of the data latch circuit 80. The logic high level signal at the data input of the data latch circuit 80 is clocked to the true output of the data latch circuit 80 by a clock signal derived from the logic high to logic low transition at the output of comparator circuit 68, and which is provided after a delay provided by the delay circuit 104, and the false output of the data latch circuit becomes a logic low level. When the false output of data latch becomes a logic low level, AND gate 76 is disabled, disabling drive circuit 90 which in turn disables switch 18 to disconnect the EHC system from the auxiliary battery. When the true output of the data latch circuit becomes a logic high level, the trouble indicator 84 is enabled. The signal EEC-1 can be used to reset the battery back-up switch control circuit 60' to initial conditions when signal EEC-1 becomes a logic low level when the vehicle engine is shut off.

Figure 8:
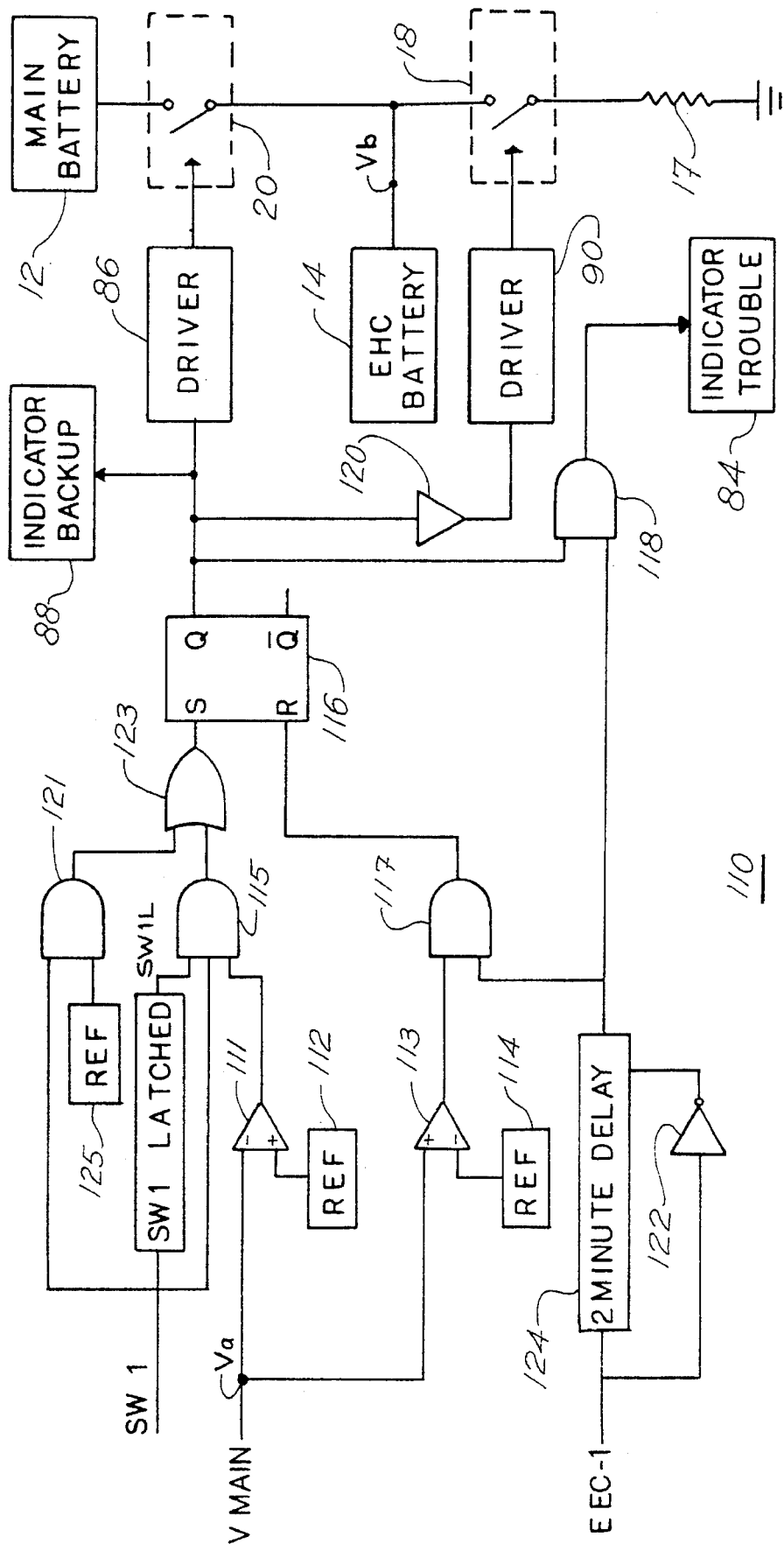
FIG. 8 is a block diagram of an embodiment of the battery back-up switch control circuit shown in FIG. 2 which provides back-up of the main battery.

Referring to FIG. 8, there is illustrated an embodiment of the battery back-up switch control circuit 110 which controls the back up of the main battery by the auxiliary battery. The switch control circuit 110 controls a trouble indicator 84, a back-up enabled indicator 88, a drive circuit 86 and a drive circuit 90, such as those included in the switch control circuits 60 and 60'. The switch control circuit 110 includes a comparator circuit 111 having an associated reference circuit 112 and a comparator circuit 113 having an associated reference circuit 114. The switch control circuit 110 further includes AND gates 115, 117, 118 and 121, OR gate 123, inverter circuits 120 and 122, a latch circuit 116 and a delay circuit 124.

The comparator circuit 111 provides a logic high level output when the main battery voltage is less than 8.6 volts. The comparator circuit 113 provides a logic high level output when the main battery voltage is greater than 13 volts.

If the engine has been cranked within the last two minutes, so that signal SW1L is at a logic high level, and if the engine is currently being cranked, so the signal SW1 is at a logic high level, then if the main voltage decreases below 8.6 volts, the output of comparator 111 becomes a logic high level, and the AND gate 115 is enabled. Moreover, the auxiliary battery 14 is connected in parallel with the main battery 12 when the ambient temperature is less than a set point value, such as −12° C. at the start of an ignition cycle. Because the main battery voltage is less than 13 volts, the output of comparator circuit 113 is at a logic low level so that AND gate 117 is disabled. Accordingly, when AND gate 115 is enabled, the latch circuit 116 is set and its true output becomes a logic high level, enabling the drive circuit 86 to cause switch 20 to operate and connect the main battery in parallel with the auxiliary battery. In addition, the back-up enabled indicator 88 is enabled. If switch 18 were enabled when the main battery voltage decreased below 8.6 volts, then the output of latch circuit 116, as applied through inverter 120 to drive circuit 90, disables drive circuit 90 to cause switch 18 to be disabled.

Similarly, if the ambient temperature is less than −12° C. at the start of an ignition cycle, as indicated by the output of reference circuit 125, AND gate 121 is enabled so that OR gate 123 is enabled and latch circuit 116 is set. When latch circuit 116 is set, switch 20 is operated to connect the main battery in parallel with the auxiliary battery.

When the engine is started and is running, signal EEC-1 becomes a logic high level. When signal EEC-1 becomes a logic high level, then after a two minute delay established by the delay circuit 124, AND gate 117 is "primed" to follow the output of comparator circuit 113. The output of comparator circuit 113 will be at a logic high level only if the main battery voltage has increased to greater than 13 volts, indicating that the main battery has been recharged sufficiently. If so, AND gate 117 is enabled, resetting the latch circuit 116 so that drive circuit 90 disables switch 20. Also, the back-up enabled indicator 88 is disabled.

If, on the other hand, the main battery voltage has not been restored, latch circuit 116 remains set, and the main battery remains connected to the auxiliary battery. Accordingly, gate 118 is enabled by the timing signal generated by delay circuit 124 and the true output of latch circuit 116, causing the trouble indicator 84 to be set. Because both the backup enabled indicator 88 and the trouble indicator 84 are enabled, the operator of the vehicle is alerted to the trouble condition, namely that the main battery is not being recharged. The signal EEC-1 can be used to reset the battery back-up switch control circuit 110 to initial conditions when signal EEC-1 becomes a logic low level when the vehicle engine is shut off.

Battery Structure (FIGS. 9–12)

The main battery 12 and the auxiliary battery 14 may be separate battery structures or may be contained within a common battery structure. When the batteries are separate battery structures, the main battery may be a conventional 12 volt lead acid battery. The auxiliary battery 14 may be any one of the many types of batteries such as lead acid, nickel cadmium, or nickel metal hydride, or any other suitable source of electrical power such as a fuel cell, a solar cell, a capacitor. When the auxiliary battery is used to provide back-up or reserve power for the main battery 12, the auxiliary battery may be a high starting power battery such as a capacitive type battery.

Referring to FIGS. 9–11, in one embodiment, the main battery 12 and the auxiliary battery 14 comprise a dual battery 130 similar to that disclosed in U.S. Pat. No. 5,002, 840 issued on Mar. 26, 1991. The dual battery 130 comprises a housing 131 including a top portion or cover 132, the inner surface of which is shown in FIG. 11, and a bottom portion of container 134. Container 134 comprises a wall 136 which divides the container into a main battery portion 141 including a plurality of main battery compartments or cells 142, and an auxiliary battery portion 143, including a plurality of auxiliary battery cells 144. Preferably, the main battery portion 141 is disposed along a main battery axis or centerline 135 such that respective main battery plates 142 in each main battery cell are disposed parallel to each other and perpendicular to main centerline 135. Main battery centerline 135 is illustratively coincident with the axis of the battery housing, which axis is typically approximately parallel to a line joining the external battery terminals, discussed below.

The individual cells 144 of the auxiliary battery portion 143 are disposed perpendicular to a centerline 137, centerline 137 being substantially perpendicular to main centerline 135. Perpendicular orientation of the main and reserve batteries reflects optimum space utilization within the envelope defined by battery housing 131.

The cover 132 includes respective main battery vent caps 139, each comprising a plurality of (e.g., three) of vent covers 139a, are suitably disposed along a line parallel to centerline 135, each vent cover 139a communicating with a corresponding main battery cell. Respective auxiliary battery vent caps 140, each comprising a plurality of vent covers 140a, are suitably disposed along a line parallel to centerline 137 in an analogous manner. Vent covers 139a and 140a comprise respective apertures for venting the main and auxiliary batteries, respectively, to the external environment.

In accordance with conventional battery terminal configurations, a positive main battery terminal 145 extends from the upper surface of cover 132, near a longitudinal edge 132a thereof, to facilitate attachment to the positive battery cable of a vehicle. Along the same longitudinal edge 132a of cover 132, a negative terminal 147 of the main battery extends upwardly through cover 132 for attachment to the negative battery cable of the vehicle (cables not shown). A positive battery terminal 145a of the auxiliary battery is disposed along edge 132b of cover 132 and a negative terminal 147a of the auxiliary battery, is disposed along edge 132b of cover 132.

A conductive bus bar connects main battery negative terminal 147 to auxiliary battery negative terminal 147a. Thus, electrical communication is established between both batteries and the vehicle electrical system through main battery terminals 145 and 147 and auxiliary positive battery terminal 145a.

In accordance with a feature of the invention, the control circuit 21 and its associated switches 16, 18 and 20 (FIG. 2) are mounted in a recess 132c formed in the inner surface of the cover 132 as illustrated in FIG. 11.

Referring to FIG. 12, the auxiliary battery 14 may be separate from the main battery 12 and mounted alongside or near the main battery in the engine compartment of the vehicle or in another location outside of the engine compartment, such as the trunk. In applications where either the electrically heated catalytic converter or auxiliary battery is located in the rear of the vehicle, a higher voltage may be required by the auxiliary battery because of the IR drops between the auxiliary battery 14 located at the front of the vehicle and the electrically heated catalytic converter located at the rear of the vehicle. In such application, a DC-DC converter or an AC-AC converter may be included in the auxiliary power system to provide 24 VDC or 48 VDC for the electrically heated catalytic converter. Also, the wire interconnecting the alternator to the control logic is a low resistance wire, such as 10 gauge wire, to minimize resistive losses.

Charge Control Circuit (FIGS. 2, 13–17)

Referring to FIG. 2, various charging modes can be employed for recharging the auxiliary battery 14 when it is used for non-critical applications. For example, in a first mode, the auxiliary battery is connected to the alternator 19 when the main battery voltage is at least a preselected value. In a second mode, charging current supplied to the auxiliary battery 14 is regulated as a function of system voltage. A third mode for recharging the auxiliary battery 14 includes using a separate alternator independently of main battery charging, as will be described with reference to FIGS. 18–21.

The first charge mode is the simplest to implement but requires that the main battery be substantially fully charged before charging current is supplied to the auxiliary battery. The second charge mode allows the secondary charging to be started sooner and avoids the "shot" of current to the auxiliary battery. The third charge mode provides isolation between the main battery system and the auxiliary battery system, but requires an additional alternator, or the addition of a winding to the existing alternator.

Additionally, the amount of charging current supplied to the auxiliary battery 14 can be varied as a function of ambient temperature around the main battery 12. For example, under cold conditions, the charging current can be supplied to the auxiliary battery 14 when the main battery voltage is at least 14 volts. Under hot conditions, the current supplied to the auxiliary battery 14 is regulated even if the main battery voltage is at or near 14 volts.

Figure 13:
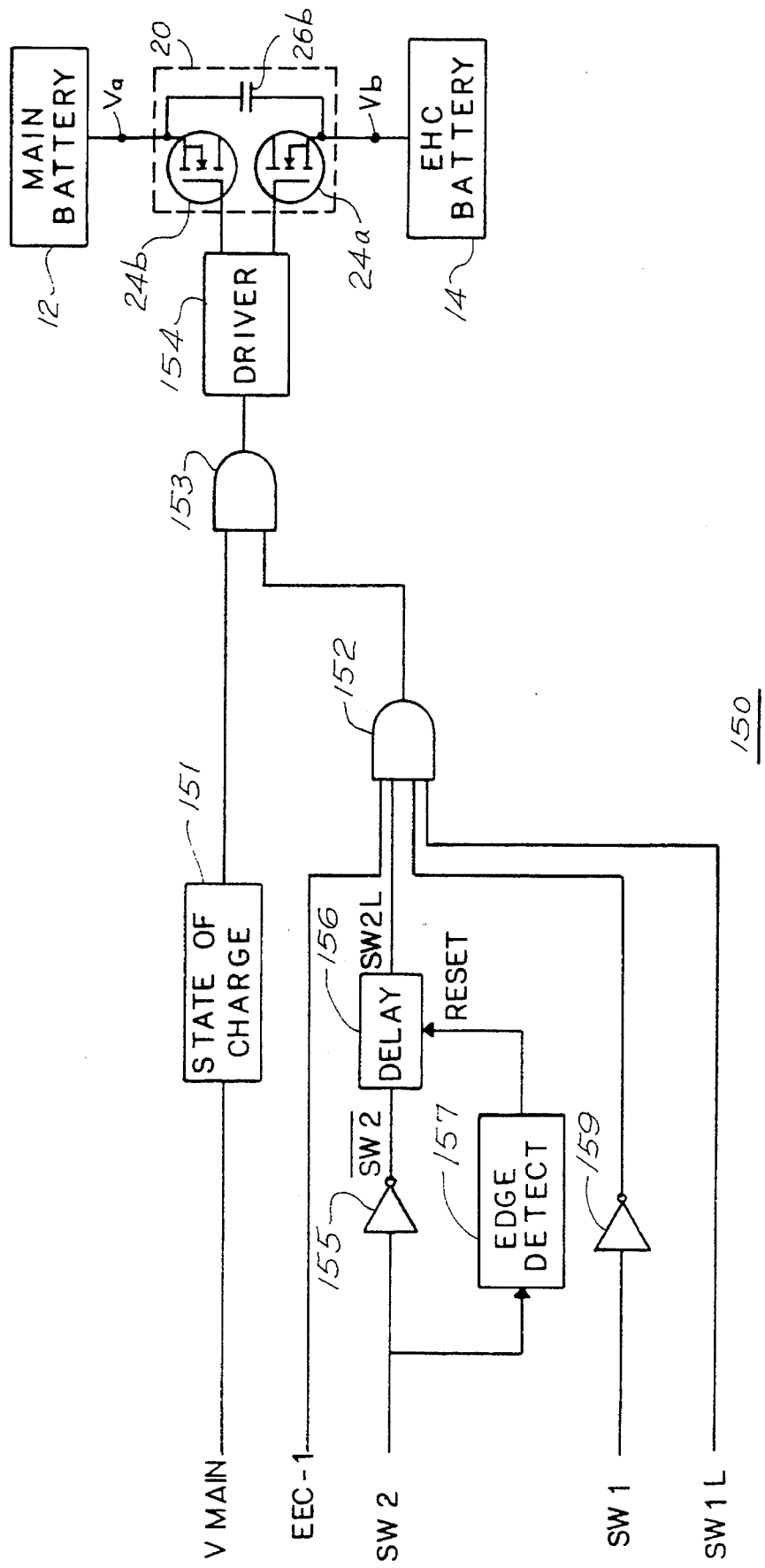
FIG. 13 is a block diagram of the charge control circuit of the battery system shown in FIG. 2 which provides normal charge operation.

Referring to FIG. 13, in accordance with one embodiment for implementing the first charge mode, the charge control circuit 150 includes a state of charge indicating circuit 151, an AND gate 152, an AND gate 153 and a drive circuit 154. The state of charge indicating circuit 151 provides an output indicative of the state of charge of the main battery. In the exemplary embodiment, the output of the state of charge indicator 151 is at a logic high level whenever the state of charge of the main battery is at least 90% of its maximum charge. The AND gate 152 is controlled by signal EEC-1, by a signal that is the inverse or complement of signal SW1, by signal SW1L, and by a signal SW2L which is derived from signal SW2 by an inverter 155, a delay circuit 156 and an edge detector circuit 157. As previously indicated, all open circuit voltage set point values are temperature compensated at the rate of 1 millivolt per degree Celsius, starting at 25 degrees Celsius. In addition, charge voltage compensation is −10 millivolts per degree Celsius and discharge voltage compensation is +10 millivolts per degree Celsius.

The AND gate 152 is enabled when signals EEC-1, SW2L, SW1L, and the signal which is the complement of signal SW1, are at a logic high level. The enabling of the AND gate 152 is predicated on signal SW2 being a logic low level, so that charging of the auxiliary battery is precluded when the EHC system is connected to the auxiliary battery. When the EHC system is disconnected from the auxiliary battery, signal SW2 becomes a logic low level. The edge detector circuit 157 responds to signal to generate a pulse which resets the delay circuit 156 which then generates a logic high level output after a ten second delay following the high to low logic level transition of signal SW2.

The AND gate 153 is enabled when the output of the state of charge indicating circuit 151 and the output of AND gate 152 are at a logic high level. When AND gate 153 is enabled, the drive circuit 154 is enabled to operate switch 20 to connect the auxiliary battery in parallel with the main battery and thus to the charge source or alternator 19 (FIG. 1). The drive circuit 154 is maintained enabled until signal EEC-1 becomes a logic low level when the engine in shut off, or if for any reason the state of charge of the main battery decreases below 90% of its maximum value.

Figure 17:
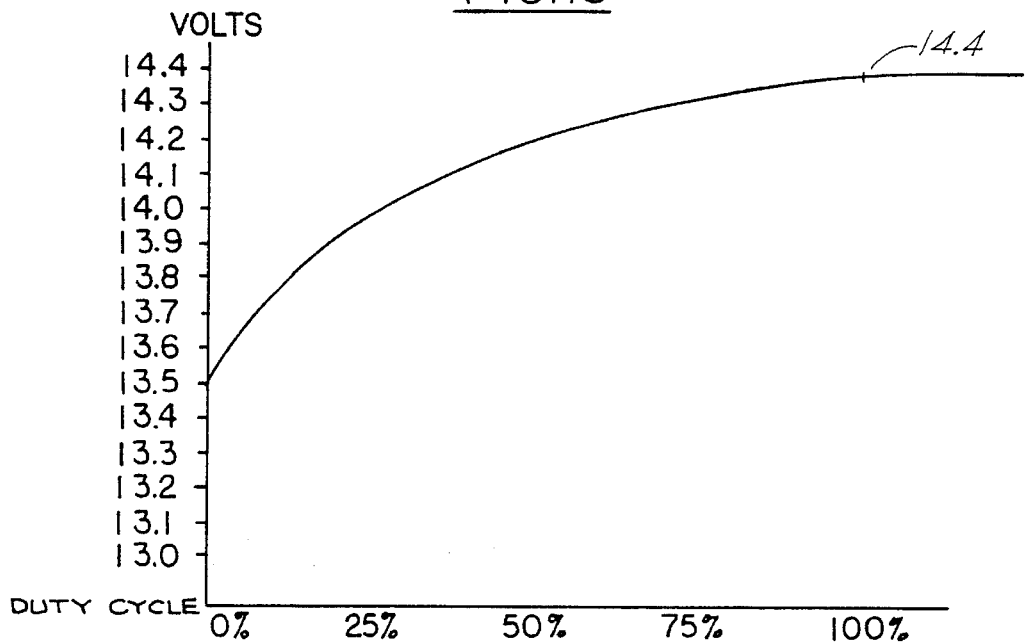
FIG. 17 is a transfer function curve illustrating the relationship between main battery voltage and the duty cycle of the charge control switching device in accordance with one mode of providing opportunity charging of the auxiliary battery.

In accordance with another aspect of the invention, the battery system allows for opportunity charging of the auxiliary battery 14. This arrangement allows the main battery 12 in the system to stay charged and permits the auxiliary battery 14 to charge only when the main battery 12 has reached an acceptable level of charging. The level of charge deliverance to the auxiliary battery 14 is made dependent on the charging voltage of the main battery 12. Therefore, the charging device regulates the charging current based on system voltage. Referring to FIG. 17, the auxiliary battery 14 is not charged until the voltage of the system reaches at least 13.5 volts. The auxiliary battery 14 then accepts charging current at a level variable from zero amps at 13.5 volts up to 25 amps when the battery voltage reaches 14.4 volts (temperature compensated).

One method of controlling opportunity current utilization for an auxiliary battery dedicated to EHC system energization, or other non-critical applications, utilizes pulse width modulation type control directly based on the primary battery charge voltage. The switching device 24a of the switch 20 is turned on to charge the auxiliary battery 14 at regulated voltage only when the main battery 12 reaches a charge voltage of 14.0 volts at 80° F. (temperature compensated at other temperatures).

The charge control circuit controls the switch to vary the amount of charging current that is supplied to the auxiliary battery as a function of at least one parameter of the main battery, such as the state of charge of the main battery. The charge control circuit is operable to vary the duty cycle of the switch to cause the amount of charging current supplied to the auxiliary battery to vary in correspondence with changes in the state of charge of the main battery.

The charge control circuit includes a drive circuit for producing a drive signal for the switch for establishing the duty cycle for the switch, and monitoring means for monitoring the main battery state of charge and controlling the drive circuit to vary the duty cycle of the switch so that width of the drive signal produced by the drive circuit increases in correspondence with increase in the state of charge of the main battery. In the exemplary embodiment, the duty cycle of the switch is increased at the rate of 5% in successive one second intervals as long as the main battery voltage does not decrease below preselected values.

In the embodiment illustrated in FIG. 2, charging current is supplied to the auxiliary battery 14 from the source of charging current 19. The main battery must be charged to at least 13.5 volts before charging current is supplied to the auxiliary battery. When main battery voltage is at least 13.5 volts, charging current is supplied to the auxiliary battery initially at low level, i.e., 1 amp, and increased gradually to about 25 amps at 14.4 volts, the maximum charge acceptance level for the auxiliary battery 14.

Whenever the main battery voltage drops below 13.8 volts, the FET is turned off for a minimum of 50 mSec before the voltage check is made again. The net effect of this type of control ensures that no current is drawn from the main battery 12 and charging current is not diminished by permitting the main battery voltage to decrease below 13.8 volts. As power becomes available to charge the auxiliary battery 14, charging current is delivered in direct proportion to available current at the regulated voltage present at the main battery 12.

Figure 14:
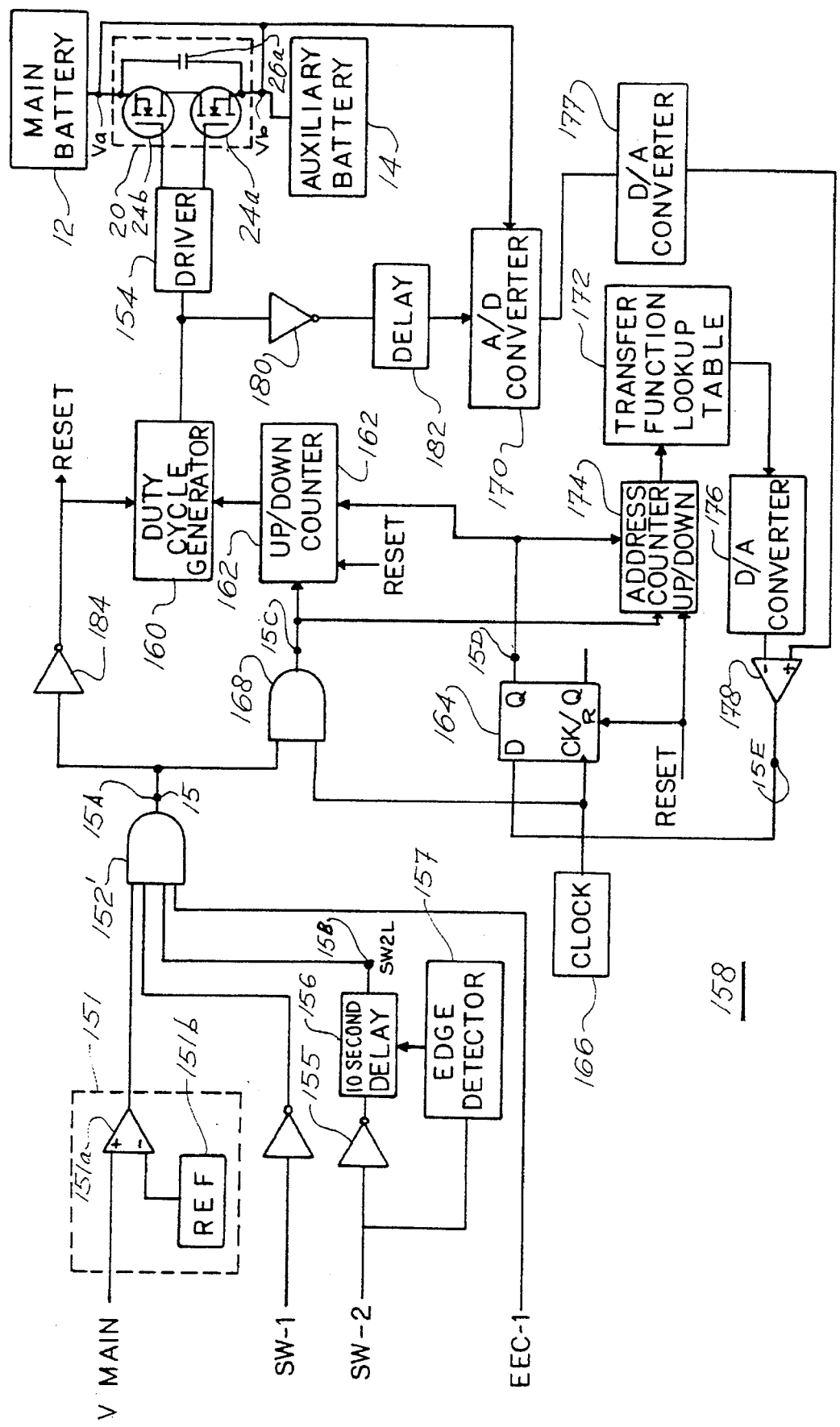
FIG. 14 is a block diagram of a further embodiment of the charge control circuit shown in FIG. 2 which provides opportunity charging of the auxiliary battery.

Referring now to FIG. 14, in accordance with a further embodiment of the charge control circuit 158, charge sharing is provided for the main battery and the auxiliary battery. This circuit permits the auxiliary battery to be connected to the alternator under certain conditions when the main battery voltage has a predetermined state of charge. In the exemplary embodiment, switch 20 is controlled to connect the auxiliary battery to the alternator when the main battery voltage is at least 13.5 volts. The conductivity of switching device 24a of the switch 20 is increased gradually by increasing the duty cycle of the drive circuit 154 from an initial value, such as 0%, in steps at a rate of 5% per second during a twenty second interval. Whenever switching device 24a is conducting, the associated switching device 24b becomes forward biased by the positive potential difference between nodes Va and Vb.

The change in the duty cycle is limited by voltage values required by the transfer function: $V_{main}=[V_{max}-0.9(1-x)]$, where Vmax is the maximum value of the main battery voltage, 14.4 volts, for example and x is the % duty cycle for the switch. These values are obtained using a table lookup function. The lookup table stores a plurality of data words, twenty data words in the exemplary embodiment, with the data words corresponding to the voltage value of the above transfer function at successive 5% increments of duty cycle.

The charge control circuit 158 includes an AND gate 152' which functions in a manner similar to AND gate 152 to produce a logic high level output whenever signals EEC-1 and SW2L are at a logic high level and signal SW1 is at a logic low level so that its complement or inverse is at a logic high level. However, the AND gate additionally responds directly to a signal produced by the main battery state of charge indicating circuit 151 which produces a logic high level whenever the main battery voltage is greater than 13.5 volts. The state of charge indicating circuit 151 includes a comparator circuit 151a which has an associated reference source 151b.

For the purpose of changing the duty cycle of the drive circuit 154, the charge control circuit includes a duty cycle generator 160, an up/down counter 162, a data latch 164 and a clock pulse generating circuit 166. The duty cycle generator 160 is controlled by the up/down counter 162 to generate enabling signals for the drive circuit 154 to enable the drive circuit 154 to produce a pulse width modulated drive signal for the switching device 24a of switch 20. The pulse width modulated drive signal causes the switching device 24a of switch 20 to be "on", or conducting, a greater or lesser period of time as a function of the time from the enabling of the charge control circuit and the maximum value of the voltage being produced by the auxiliary battery as a function of time from initialization of the circuit. Under normal conditions, the width of the drive signal is increased at a rate of five percent per second to a value to be fully conducting, providing a maximum value of 14.4 volts for the auxiliary battery voltage after twenty seconds. However, the duty cycle of the drive circuit, and thus the width of the drive signal it provides, is decreased if the main battery voltage decreases below the value indicated by the voltage transfer function for the current duty cycle. The up/down condition for the up/down counter 162 is indicated by the state of the output being provided by the data latch 164. The clock pulses generated by the clock pulse generating circuit 166 establish the time period for the variable duty cycle circuit. The clock pulses are applied to the clock input of the counter by an AND gate 168 when the output of the AND gate 152' is at a logic high level. The data latch 164 is controlled to switch the state of its output to cause the duty cycle to be increased in fixed increments from an initial value, such as 0%, but to limit the amount of increase in the duty cycle to a value so as to maintain the main battery voltage at or above a value corresponding to the transfer function for that value or % of the duty cycle.

For the purpose of controlling the data latch 164, the charge control circuit includes an analog to digital converter 170, a transfer function table lookup memory 172, a memory address counter 174, a digital to analog converter 176, a digital to analog converter 177 and a comparator circuit 178. The table lookup memory 172 stores data words representing minimum values for the main battery voltage as a function of the duty cycle of the drive circuit. The data words are stored in the memory 172 at locations addressable by the memory address counter 174 which generates memory addresses which are correlated with the current duty cycle of the drive circuit 154. To this end, the count input of the memory address counter is connected to the output of AND gate 168 to receive the clock pulses being gated to the up/down counter 162 so that the memory address counter in stepped in synchronism with the up/down counter 162. The analog to digital converter 170 samples the main battery voltage during each cycle as the duty cycle is increased by fixed amounts. A convert command for the analog to digital converter 170 is derived from the output of the duty cycle generator 160 by an inverter 180 and a delay circuit 182. The delay circuit causes the convert command to be generated during the portion of the cycle that the switching device 24a is non-conducting.

The digital to analog converter 176 converts digital signals read out of the table lookup memory to an analog signal which is applied to the comparator circuit 178 for comparison with the analog signal produced by digital to analog converter 177 from the sample generated by the analog to digital converter 170. The comparator circuit 178 produces a signal at the data input of the data latch 164 which indicates whether the main battery voltage is above or below the voltage of the transfer function for the duty cycle of the drive circuit 154.

The signal output of AND gate 152' is inverted by inverter 184 to produce reset signals for the duty cycle generator 160, the up/down counter 182, the data latch 164 and the memory address counter 174 so that these circuit elements are initialized each time that the AND gate 152' is disabled. This sets the duty cycle generator 160 to its initial value. In addition, the up/down counter is set to a count which provides the minimum duty cycle for the drive circuit and the memory address counter is set to a count for the address corresponding to a zero duty cycle.

Figure 15:
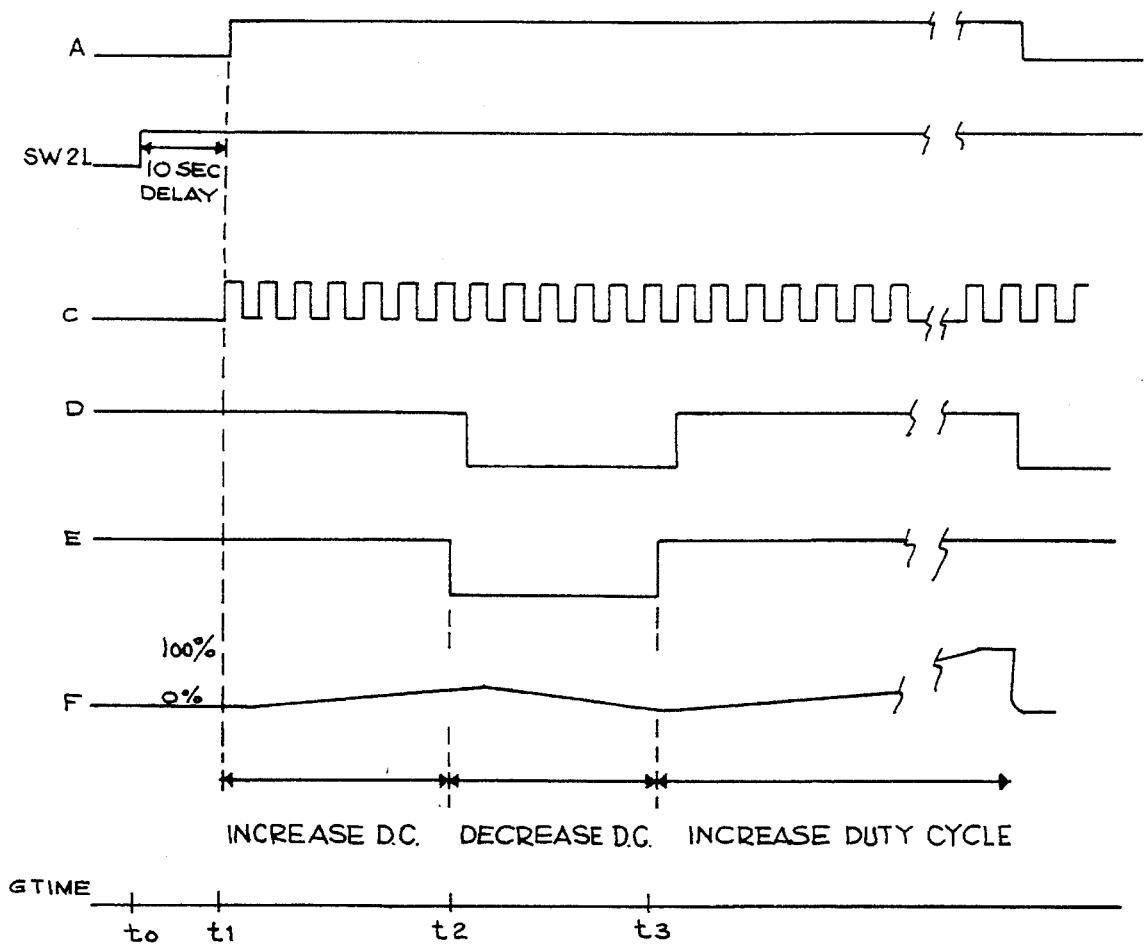
FIG. 15 is a timing diagram illustrating the time relationships of signals of the charge control circuit shown in FIG. 14.

Referring to FIG. 14 and to the timing diagram provided in FIG. 15, it is assumed that initially, at time $t_o$, the output of AND gate 152' at 15A is at a logic low level, as shown in FIG. 15 at line A, and that signal SW2 at 15B is at a logic low level, as shown in FIG. 15 at line B. Also, the output of the comparator circuit 178 at 15E is at a logic high level, as shown in FIG. 15 at line E. It is also assumed that clock pulses provided by the clock pulse generating circuit 166 have clocked the logic high level signal to the true output of the data latch 164 at 15D which is at a logic high level, as shown in FIG. 15 at line D. Accordingly, the up/down counter 142 and the memory address counter 174 are set to count up.

When signals SW1 and SW2 become logic low level so that their complements becomes logic high level, and when signal EEC-1 becomes a logic high level, then if the main battery voltage is at least 13.5 volts, then at time $t_1$, after the ten second delay provided by the delay circuit 156, FIG. 15 at line B, signal SW2L is generated to enable AND gate 152'. When AND gate 152' is enabled, its output becomes a logic high level, as shown in FIG. 15 at line A. Accordingly, AND gate 168 is enabled to gate the clock pulses generated by the clock pulse generating circuit 166 to the count inputs of the up/down counter 162 and the memory address counter 164, shown in FIG. 15 at line C. The up/down counter and the memory address counter 164 are incremented at a rate of one count per second.

Initially, the duty cycle of the drive circuit 154 is set to its minimum value. The up/down counter 162 continues to count clock pulses causing the duty cycle generator 160 to increase the duty cycle of the drive circuit by 5% each second. Because the conducting or "on" time for switching device 24a is increased, the auxiliary battery voltage increases as shown in FIG. 15, at line F which represents the average voltage of the auxiliary battery as a percent of a maximum value.

The memory address counter 174 is incremented by the clock pulses gated by AND gate 168 and in response to each clock pulse, the table lookup memory is indexed at successive memory storage locations storing the transfer function values for the duty cycle. The signals provided at the output of the duty cycle generator 160 are inverted by inverter 180 and delayed by the delay circuit 182 to produce convert commands for the analog to digital converter 170 which samples and holds the main battery voltage. The digital signal sample is applied through digital to analog converter which provides an analog voltage sample representative of the main battery voltage at the positive input of the comparator circuit 178.

To illustrate the control function, it is assumed that at time $t_2$ the main battery voltage decreases below the level established by the transfer function. Accordingly, the main battery voltage will be less than the transfer function voltage level represented by the data currently read out of the table lookup memory and applied to the comparator circuit 178. Accordingly, when the data read out of the table look up memory is compared with the signal sample provided by the analog to digital converter, the output of the comparator circuit 178 becomes a logic low level, as shown in FIG. 15 at line E. When the output of the comparator circuit 178 becomes a logic low level, a logic low level is provided at the data input of the data latch 164. The next clock pulse gates this logic low level signal to the output of the data latch 164 which becomes a logic low level, as shown in FIG. 15 at line D.

Consequently, the up/down counter 162 and the memory address counter 174 will be decremented by the next clock pulses, and the duty cycle of the drive circuit 154 will be decreased. Also, the count up/down function of the memory address counter is reversed and so that the memory address counter addresses the memory location which stores the transfer function value corresponding to the next lower duty cycle and then reduced 5% each second until the main battery voltage again becomes equal to the transfer function voltage represented by the data read out of the memory. In the example, it is assumed that the duty cycle is reduced to the initial condition, or 0% duty cycle, by time $t_3$.

Additionally, it is assumed that this reduction in duty cycle causes the main battery voltage level to increase to or above the voltage indicated by the transfer function. Accordingly, when the main battery voltage is compared with the transfer function for a 0% duty cycle, the output of the comparator circuit 178 becomes a logic high level, as shown in FIG. 15 at line E. At the next clock pulse, the output of the data latch 164 becomes a logic high level, as shown in FIG. 15 at line D. This causes the count up/down counter 162 to begin counting up and causes the memory address counter 174 to address the memory address location for a 5% duty cycle. The duty cycle generator is enabled to increase the duty cycle of the drive circuit 154 by 5% each second as long as the main battery voltage remains at or above the transfer function value. Each time the main battery voltage decreases below the transfer function value, the duty cycle is decreased 5% each second until the main battery voltage again is at or above the voltage of the transfer function for that duty cycle. The operation continues with the duty cycle being increased in increments of 5% each second until the duty cycle is 100%. When the duty cycle is at 100% the auxiliary potential at node Vb corresponds to the main battery potential at node Va and the drive circuit 154 responsively causes contacts 26b to close to provide a low resistance path between the main battery and the auxiliary battery. The control circuit 21 which connects the auxiliary battery 14 to the source of charging current 19 responds to a voltage level of 14.4 for the auxiliary battery to operate switch 24 to close contacts to provide a low resistance connection between the auxiliary battery 14, the main battery 12 and the alternator 19.

If the signal EEC-1 becomes a logic low level, or if either one of the signals SW2 or SW1 becomes a logic high level, or if the main battery voltage decreases to or below 13.5 volts, then the AND gate 152' is disabled, generating a reset signal that resets the duty cycle generator 160, the data latch 164 and the counters 162 and 174.

Figure 16:
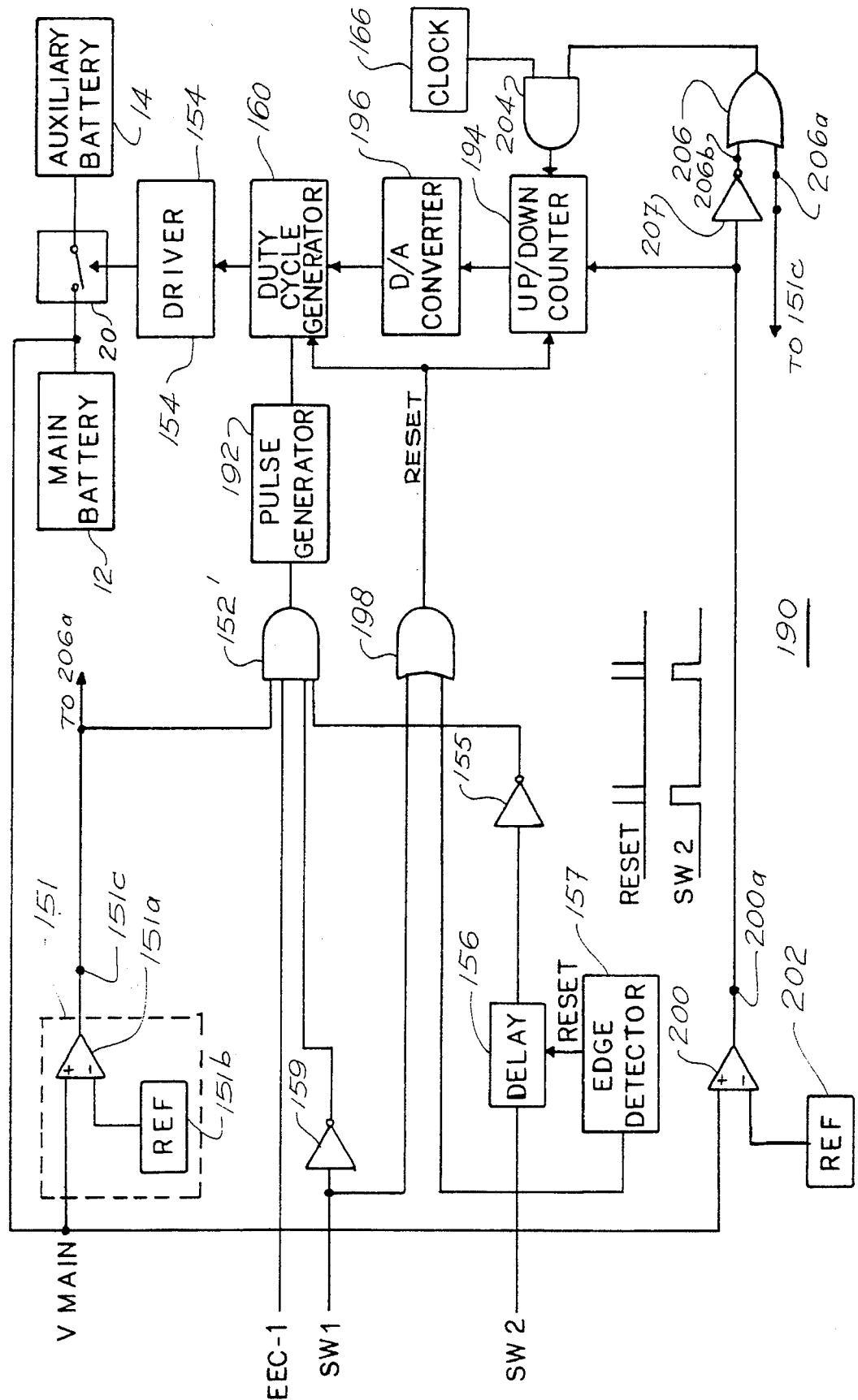
FIG. 16 is a block diagram of a further embodiment of the charge control circuit shown in FIG. 2 which provides opportunity charging of the auxiliary battery.

Referring to FIG. 16, there is illustrated a further embodiment of the charge control circuit 190 which provides charge sharing while protecting the main battery state of charge. In charge control circuit 190, the auxiliary battery receives charging current only when the main battery voltage is greater than 14 volts. Also, the duty cycle of the drive circuit is started at 0% and increased in increments of 5% per second to 100%, but if either one of the signals SW1 or SW2 becomes a logic high level, the duty cycle is reset to 0%. Moreover, if the main battery voltage decreases to or below 13.8 volts, then the duty cycle is decreased 50% per second until the main battery voltage recovers to 14 volts.

The charge control circuit 190 includes an AND gate 152' which functions in a manner similar to AND gate 152 to produce a logic high level output whenever signal EEC-1 is at a logic high level and signals SW2 and SW1 are at logic low levels. However, the AND gate additionally responds directly to a signal produced by the main battery state of charge indicating circuit 151 which produces a logic high level whenever the main battery voltage is at least 14 volts. The state of charge indicating circuit 151 includes a comparator circuit 151a which has an associated reference source 151b. The output of AND gate 152' is connected to the input of a pulse generating circuit 192 which responds to a logic low to logic high level transition of the signal output of the AND gate 152' to produce a pulse which resets the duty cycle generator 160 to its initial state to provide a zero percent duty cycle for the drive circuit 154.

For the purpose of increasing the duty cycle of the drive circuit, an up/down counter 194 driven by clock pulses at a 1 Hz rate generated by clock pulse generating circuit 166, provides a digital signal output which is converted into an analog signal by digital to analog converter 196 for controlling the duty cycle generator 160. The signals SW1 and SW2 are combined by OR gate 198 to provide a reset signal which holds the up/down counter 194 and the duty cycle generator 160 reset, providing a zero duty cycle, until both signals SW1 and SW2 are logic low levels.

For the purpose of decreasing the duty cycle of the drive circuit when the main battery voltage decreases to or below 13.8 volts, a signal comparator 200 compares the main battery voltage with a reference corresponding to 13.8 volts which is provided by reference circuit 202 associated with the comparator circuit 200. The output of the comparator circuit is connected to the count up/down select input of the up/down counter 194, enabling the up/down counter 194 to count up whenever the output of the comparator circuit is at a logic high level and to count down whenever the output of the comparator circuit is at a logic low level.

Because the main battery voltage must be at least 14 volts, that is the output of comparator circuit 151a must be at a logic high level, for the charge control circuit t 90 to enable the switching device 24a of switch 20, the output of the comparator circuit 200 normally is at a logic high level. Accordingly, the up/down counter 194 normally is enabled to count up. Also, assuming initially that either one of the signals SW1 and SW2 is at a logic high level, then the duty cycle generator 160 and the up/down counter 194 are held reset by the logic high level output of the OR gate 198.

When signal EEC-1 becomes a logic high level and signals SW1 and SW2 become logic low levels, then after the ten second delay provided by the delay circuit 156, the AND gate 152' is enabled and its output becomes a logic high level. Also, because signals SW1 and SW2 are now at logic low levels, the reset signal is removed from the duty cycle generator 160 and the up/down counter 194. Accordingly, the up/down counter counts the clock pulses generated by the clock pulse generating circuit 166.

Initially, the duty cycle of the drive circuit 154 is set to its minimum value. The up/down counter 194 counts clock pulses and causes the duty cycle generator 160 to increase the duty cycle of the drive circuit by 5% for each clock pulse. The conducting or "on" time for switching device 24a of switch 20 is increased, causing the auxiliary battery voltage to increase. The duty cycle is increased 5% each second until the duty cycle is 100%.

If the main battery voltage decreases to a value to or below 13.8 volts, the output of comparator circuit 200 becomes a logic low level, switching the state of the up/down counter to a count down condition. Accordingly, the up/down counter 194 will count down to cause the duty cycle of the drive circuit to be decreased by 50% each second until the main battery voltage increases to a value greater than 13.8 volts. At such time, the output of the comparator circuit 200 becomes a logic high level and the operation of the up/down counter is switched to a count up mode, enabling the duty cycle to be increased in increments of 5% per second to a 100% duty cycle.

The clock pulses are gated to the up/down counter 194 by AND gate 204 which is controlled by OR gate 206. The OR gate 206 has one input 206a connected to the output 151c of the comparator circuit 151 and a second input 206b connected to the output of an inverter 207 which has its input connected to the output 200a of the comparator circuit 200. The AND gate 204 and the OR gate 206 establish a window which permits the clock pulses to be gated to the up/down counter 194 only if the main battery voltage $V_{main}$ is less than 14 volts and greater than 13.8 volts.

If either signal SW1 or SW2 becomes a logic high level, the OR gate 198 is enabled, causing the duty cycle generator 160 and the up/down counter 194 to be reset to their initial condition, causing the duty cycle of the drive circuit 154 to be reset to zero.

Independent Charging Source For the Auxiliary Battery (FIGS. 18–21)

Figure 18:
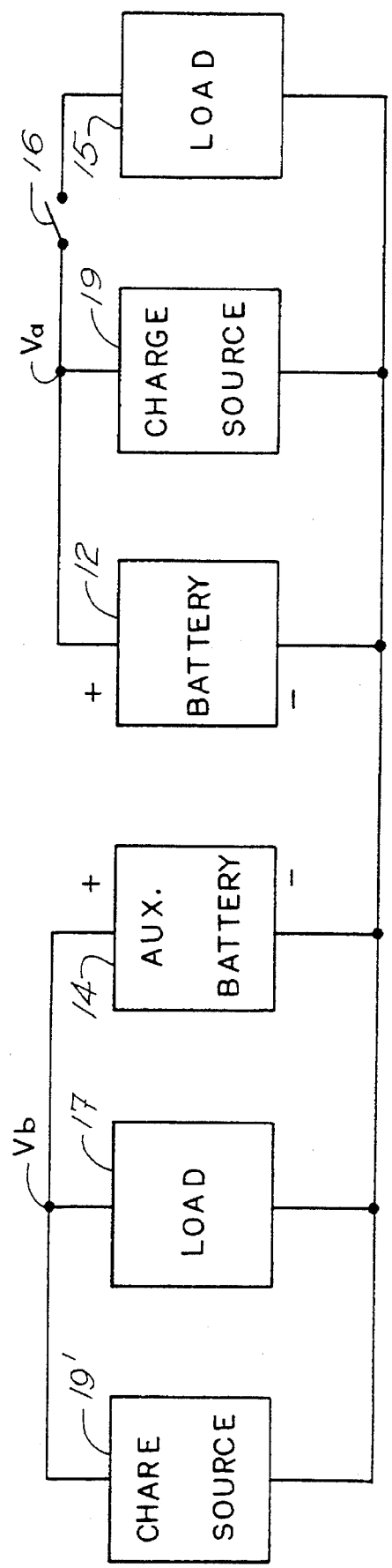
FIG. 18 is a block diagram of a battery system provided by the present invention, including a main battery and an auxiliary battery having separate charging sources.
Figure 19:
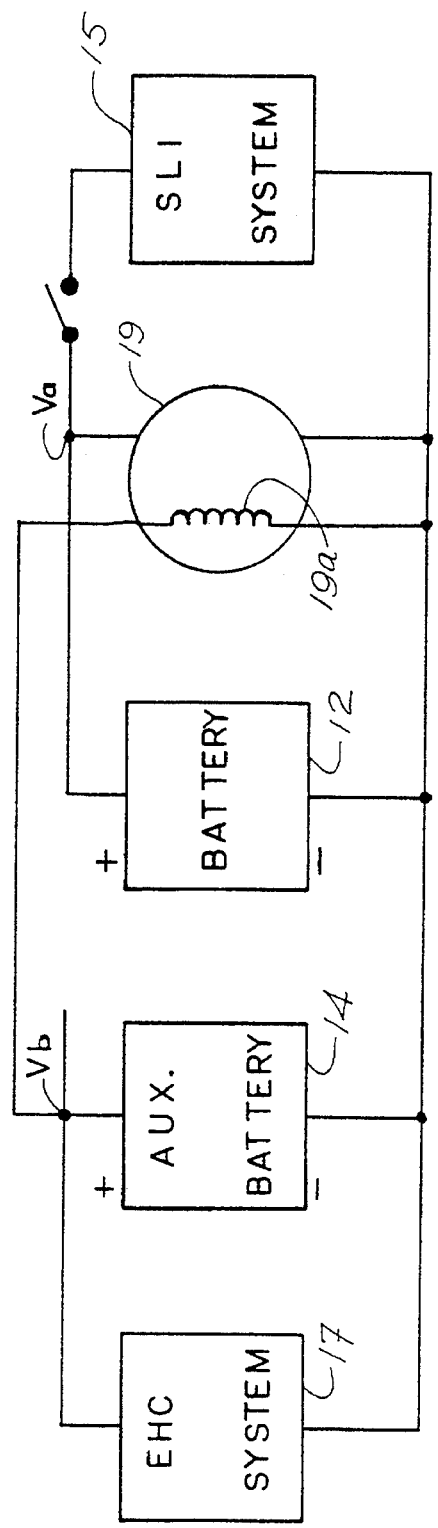
FIG. 19 is a block diagram of a vehicle battery system including a main battery and an auxiliary battery wherein the charging source for the auxiliary battery includes an auxiliary winding on the vehicle alternator.
Figure 20:
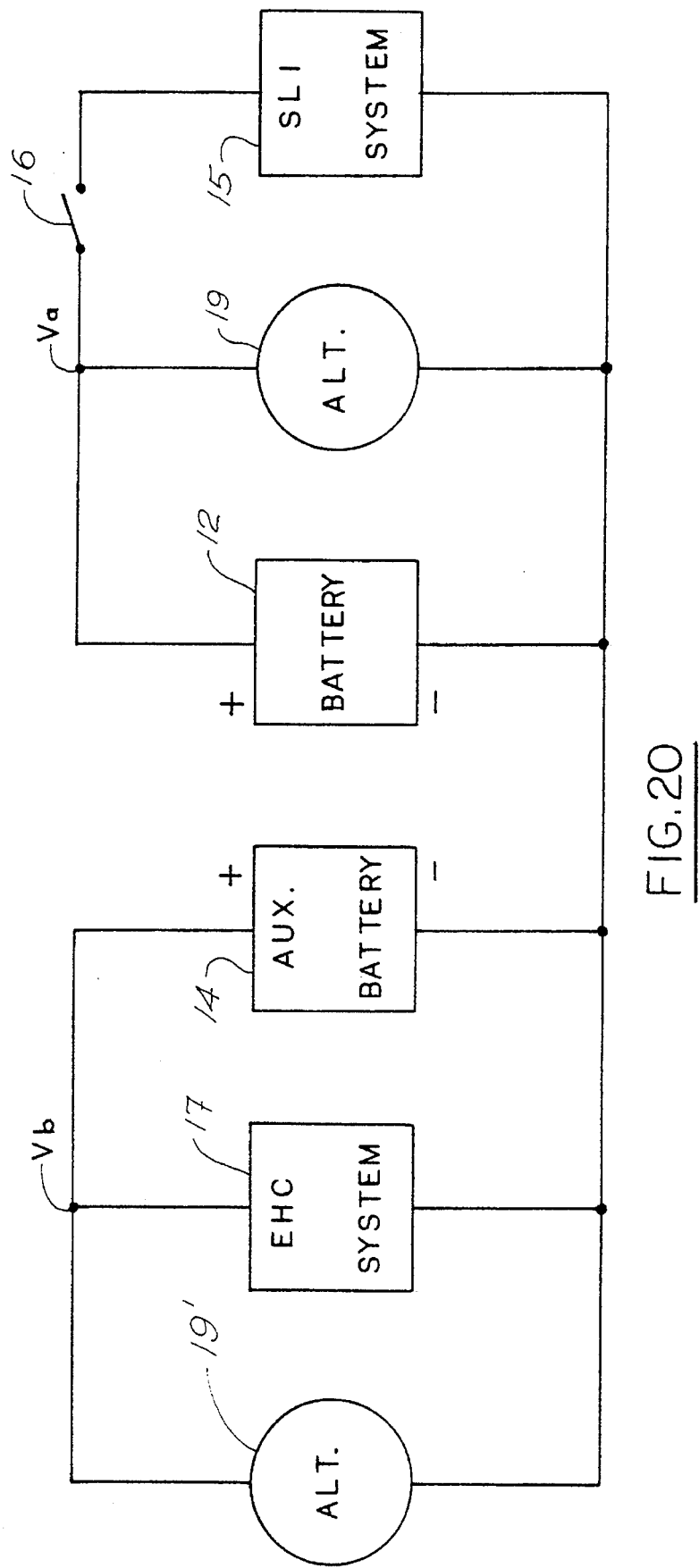
FIG. 20 is a vehicle battery system including a main battery and an auxiliary battery, and separate alternators for charging the two batteries.

For the embodiments illustrated in FIGS. 1 and 2, the auxiliary battery 14 is integrated into the main battery circuit portion of the vehicle electrical system and receives charging current from the charging source 19 that charges the main battery 12. In FIGS. 18–21, there are illustrated embodiments of the battery system provided by the present invention which includes a separate charging source 19' for the auxiliary battery 14. In FIG. 18, the auxiliary charging source 19' is shown connected in parallel with the auxiliary battery 14. By way of example, the auxiliary source may be an auxiliary winding 19a on the alternator 19 as illustrated in FIG. 19. In FIG. 20, the auxiliary source 19' is illustrated as a separate alternator connected in parallel with the auxiliary battery 14.

Figure 21:
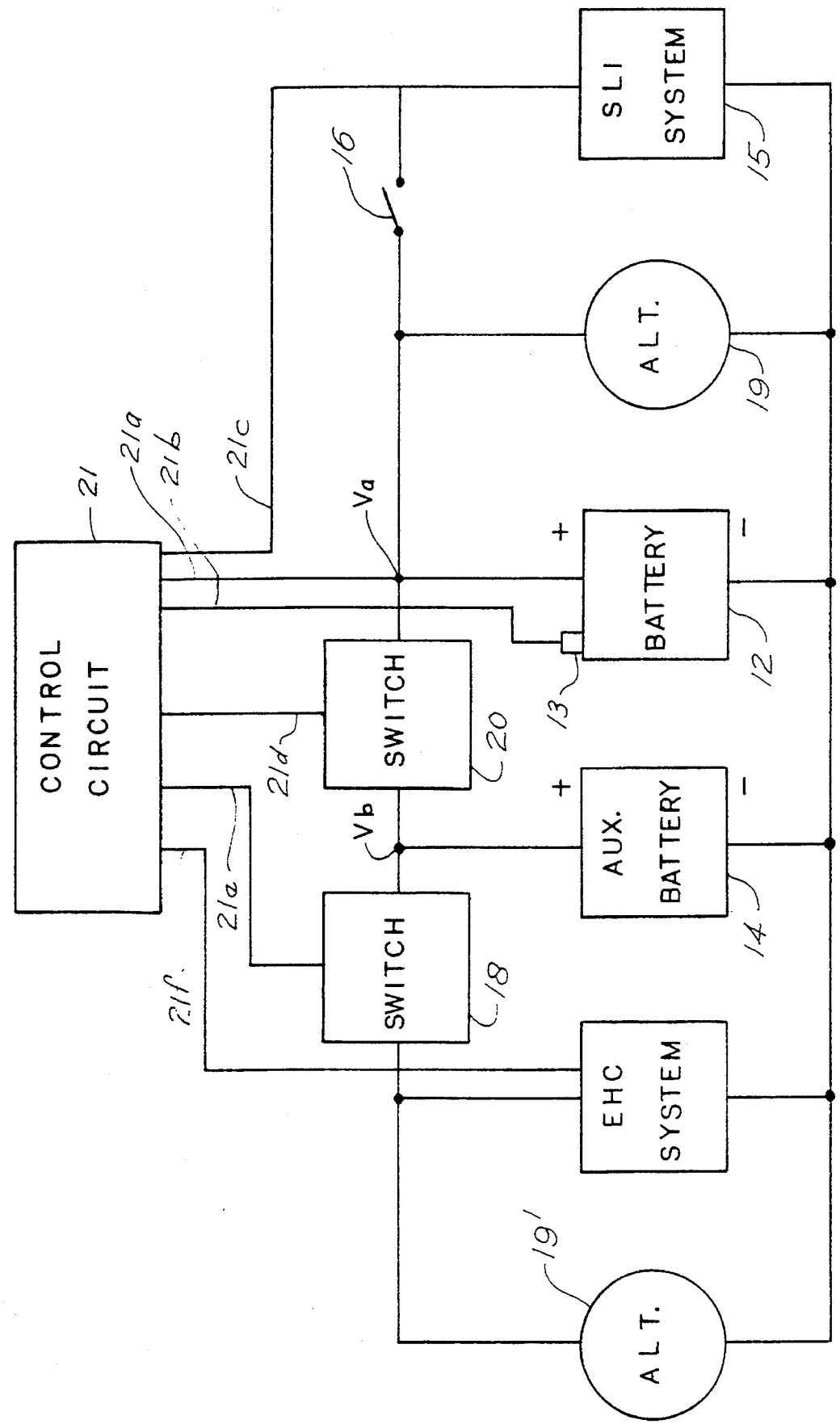
FIG. 21 illustrates the vehicle battery system of FIG. 20 modified to operate in a back-up mode, permitting power from the auxiliary battery to be supplied to the main battery load.

In the battery system of FIG. 21, the auxiliary battery 14 provides back-up for the main battery 12. The circuit illustrated in FIG. 21 is similar to the circuit shown in FIG. 20, but further includes a control circuit 21 and a pair of switches 18 and 20 which operate in the manner of like numbered elements in FIG. 2 to connect the auxiliary battery 14 in circuit with the main battery 12 by operating switch 20, while switch 18 is not operated. Normally, switch 18 is operated to connect the auxiliary battery to the load 17 and to the auxiliary alternator 19'. When main battery back-up is required, switch 18 disconnects the load 17 and auxiliary alternator 19' from the battery 14 and switch 20 is operated to connect battery 14 in parallel with the main battery 12.

Thus, it has been shown that the present invention provides a battery system for a vehicle which includes a main battery for energizing the starting circuit, the vehicle lights and the vehicle ignition circuit, and an auxiliary battery which energizes accessories of the vehicle, such as the vehicle EHC system. The provision of an independent battery source for the EHC system minimizes the drain on the main battery, particularly during start-up. The battery system provides a battery back-up function whereby the auxiliary battery is backed-up by the main battery under certain conditions and wherein the main battery is backed up by the auxiliary battery under certain conditions. Thus under normal operating conditions, wherein the engine has been started, if the auxiliary battery voltage is low, and the main battery has sufficient state of charge to support backup of the auxiliary battery, then the main battery is connected in parallel with the auxiliary battery, for maintaining the EHC system energized. If the main battery becomes loaded to the extent that continued operation would be detrimental to the operation of the vehicle, the main battery is disconnected from the auxiliary battery and a trouble indication is provided for the operator of the vehicle in accordance with another aspect of the invention, the battery system provides opportunity charging of the auxiliary battery. Once the vehicle engine is running and the main battery is receiving charging current in the conventional manner, then under certain conditions, the auxiliary battery can share the charging current with the main battery so that the auxiliary battery charging can be completed sooner. The auxiliary battery is gradually connected to the charging current for the main battery, for example, by increasing the duty cycle of the drive circuit that connects the auxiliary battery to the source of charging current while monitoring the state of charge of the main battery. If the main battery state of charge is affected due to the main battery being connected in circuit with the auxiliary battery, the duty cycle of the drive circuit is decreased until the main battery recovers. In other embodiments, separate sources of charging current are provided for the auxiliary battery.

Although the load control circuit, the battery back-up switch control circuit, and the charge control circuit have been described as individual circuits to simplify the drawings and the description, these circuits can be combined in a single circuit which controls common load and charge back-up switch devices. In addition, the output of the temperature sensor 13 can be used in the switching functions in the manner described in the U.S. Pat. Nos. 5,204,610 and 5,002,840 referenced above. Moreover, other changes and modifications are possible without departing from the spirit and scope of the invention as defined by the following claims.

We claim:

1. In a power supply system for a motor vehicle including a first storage battery for supplying electrical power to a primary load of the vehicle, said primary load including at least the starter motor and the ignition circuit Of the vehicle, the improvement comprising:

a second storage battery for supplying electrical power to an electrically heated catalytic converter system of the vehicle;

first switching means for connecting said electrically heated catalytic converter system to said second storage battery;

second switching means for connecting said second storage battery in parallel with said first storage battery;

and control means including means responsive to operation of an ignition switch of the vehicle to cause said first switching means to operate and connect said catalytic converter system to said second storage battery, and said control means including inhibit means for preventing said second switching means from connecting said second storage battery in parallel with said first storage battery when said catalytic converter system is connected to said second storage battery by said first switching means.

2. The system of claim 1, wherein said control means includes monitoring means for monitoring at least one parameter indicative of the state of charge of one of said storage batteries to enable said second storage battery to be connected in circuit with said first storage battery as a function of said one parameter.

3. In a power supply system for a motor vehicle including a first storage battery for supplying electrical power to a primary load of the vehicle, the improvement comprising:

a second storage battery for supplying electrical power to a secondary load of the vehicle;

first switching means for connecting said secondary load to said second storage battery;

second switching means for connecting said second storage battery in parallel with said first storage battery;

and control means including inhibit means for preventing said second switching means from connecting said second storage battery in parallel with said first storage battery when said secondary load is connected to said second storage battery, said control means including override means for overriding said inhibit means as a function of a parameter indicative of the state of charge of one of said storage batteries to enable said second switching means to connect said second storage battery in parallel with said first storage battery while said secondary load is connected to said second storage battery.

4. In a power supply system for a motor vehicle including a first storage battery for supplying electrical power to a primary load of the vehicle, the improvement comprising;

a second storage battery for supplying electrical power to a secondary load of the vehicle;

first switching means for connecting said secondary load to said second storage battery;

second switching means for connecting said second storage battery in parallel with said first storage battery;

and control means including inhibit means for preventing said second switching means from connecting said second storage battery in parallel with said first storage battery when said secondary load is connected to said second storage battery, said control means including first monitoring circuit means for monitoring the state of charge of said second storage battery, enabling means responsive to said first monitoring means for connecting said second storage battery in parallel with said first storage battery when the state of charge of said second storage battery is less than a preselected value, and second monitoring circuit means for monitoring the state of charge of said first storage battery, said inhibit means overriding said enabling means to prevent said second switching means from connecting said first storage battery in parallel with said second storage when the state of charge of said first storage battery is less than a preselected value.

5. The system of claim 1, wherein said first storage battery includes a battery housing, said second storage battery being located within said battery housing.

6. The system of claim 5, wherein said control means is located within said battery housing.

7. A power supply system according to claim 1, including a source of charging current for supplying charging current to said first storage battery, and means for connecting said second storage battery to said source of charging current to supply charging current to said second storage battery as a function of the state of charge of said first storage battery.

8. A power supply system according to claim 1, including a first source of charging current for supplying charging current to said first storage battery, and a second source of charging current for supplying charging current to said second storage battery.

9. In a power supply system for a motor vehicle including a main storage battery for supplying electrical power to a primary load of the vehicle, said primary load including at least the starter motor and the ignition circuit of the vehicle, the improvement comprising:

an auxiliary storage battery for supplying electrical power to an electrically heated catalytic converter system of the vehicle;

first switching means for connecting said catalytic converter system to said auxiliary storage battery;

second switching means for connecting said auxiliary storage battery in parallel with said main battery;

and control means including a load switch control circuit responsive to operation of an ignition switch of the vehicle to cause said first switching means to operate and connect said auxiliary storage battery to said catalytic converter system during starting of the engine of the vehicle, said control means including monitoring means for monitoring the state of charge of said main storage battery and for preventing operation of said load switch control circuit when the state of charge of said main storage battery is less than a given value, and back-up control circuit means responsive to said monitoring means for controlling said second switching means to connect said auxiliary storage battery to said primary load to enable said auxiliary storage battery to supply electrical power to said primary load of the vehicle, whereby said auxiliary storage battery serves as a back-up power source for said main storage battery.

10. The power supply system of claim 8, wherein said control means causes said first switching means to disconnect said catalytic converter system from said auxiliary storage battery prior to connecting said auxiliary storage battery in parallel with said main storage battery.

11. In a power supply system for a motor vehicle including a main storage battery for supplying electrical power to a primary load of the vehicle, the improvement comprising:

an auxiliary storage battery for supplying electrical power to a secondary load of the vehicle;

first switching means for connecting said secondary load to said auxiliary storage battery;

second switching means;

and control means for controlling said second switching means to connect said auxiliary storage battery to said primary load to enable said auxiliary storage battery to supply electrical power to said primary load of the vehicle, whereby said auxiliary storage battery serves as a back-up power source for said main storage battery, and wherein said second switching means connects said auxiliary storage battery in parallel with said main storage battery whereby said main storage battery serves as a back-up power source for said auxiliary storage battery whenever the state of charge of said auxiliary battery decreases below a given level while said secondary load is connected to said auxiliary storage battery.

12. The power supply system of claim 11 wherein said control means includes monitoring means coupled to said main storage battery for monitoring the state of charge of said main storage battery, and enabling means responsive to said monitoring means for enabling said second switching means to connect said auxiliary storage battery in parallel with said main storage battery only when the state of charge of said main storage battery is above a predetermined level.

13. A power supply system for a motor vehicle for supplying electrical power to a primary load and a secondary load of the vehicle, comprising:

a first storage battery for supplying electrical power to the primary load;

a source of charging current connected to said first storage battery for supplying charging current to said first storage battery;

a second storage battery;

first switching means for connecting said secondary load to said second storage battery for supplying electrical power to the secondary load;

second switching means for connecting said second storage battery to said source of charging current;

and control means for controlling said first and second switching means to prevent the connection of said second storage battery to said source of charging current while said secondary load is connected to said second storage battery, said second switching means comprising at least one solid state switching device, drive circuit means for providing a drive signal for said switching device, and a relay having a pair of contacts connected in circuit with said solid state switching device, said relay being operated independently of said switching means.

14. A power supply system for a motor vehicle comprising:

a main storage battery for supplying electrical power to a load, an auxiliary storage battery for supplying electrical power to said load, a source of charging current connected to said main storage battery for supplying charging current to said main storage battery, switching means enabled in response to a predetermined condition for connecting said auxiliary storage battery to said source of charging current to supply charging current to said auxiliary storage battery from said source of charging current, and control means for controlling said switching means to supply charging current to said auxiliary storage battery as a function of at least one parameter of said main storage battery, said control means including drive circuit means for producing a drive signal for said switching means for establishing the duty cycle for said switching means, and monitoring means for monitoring said one parameter of said main storage battery and controlling said drive circuit means to vary the duty cycle of said switching means, and said control means varying the duty cycle of said switching in predetermined increments during successive intervals of time with increase in the state of charge of said main battery, and wherein the change in the charging current being supplied to said auxiliary storage battery during each increment of time is correlated with a voltage transfer function: $V=V_{max}(0.9)(1x)$, where $V_{max}$ is the maximum charge condition for the main storage battery, and x is the duty cycle of the switching means.

15. The power supply system of claim 14, wherein said control means causes the duty cycle of said switching means to be decreased whenever the state of charge of said main storage battery decreases during any one of said intervals of time.

16. A power supply system for a motor vehicle comprising:

a main storage battery for supplying electrical power to a primary load, said primary load including at least the starter motor and the ignition circuit of the vehicle, an auxiliary storage battery for supplying electrical power to an electrically heated catalytic converter system, a source of charging current connected to said main storage battery for supplying charging current to said main storage battery, first switching means for connecting said auxiliary storage battery to said catalytic converter system, second switching means for connecting said auxiliary storage battery to said source of charging current whereby charging current is supplied to said auxiliary storage battery from said source of charging current, and control means for controlling said second switching means to vary the amount of charging current supplied to said auxiliary storage battery as a function of at least one parameter of said main storage battery, said control means including drive circuit means for producing a pulse modulated drive signal for said second switching means to establish the duty cycle for said second switching means, and timing means for controlling said drive circuit means for increasing the pulse width of said drive signal in successive intervals of time to thereby increase the amount of charging current supplied to said auxiliary storage battery during said successive intervals of time.

17. The system of claim 16, wherein said control means includes monitoring means for providing a control output when the state of charge of said main storage battery is less than a predetermined value and means responsive to said control output for overriding said timing means to decrease the duty cycle and therefore the rate of charge of said auxiliary storage battery in correspondence with the decrease in state of charge of said main storage battery.

18. The power supply system of claim 16, wherein said control means includes means for enabling said second switching means only when said main storage battery has reached an acceptable level of charge, whereby the level of charge delivery to said auxiliary storage battery is dependent on the charging voltage of said main storage battery.

19. The power supply system of claim 16, wherein said control means includes means for enabling said second switching means while said main storage battery has a first state of charge, whereby said auxiliary storage battery receives charging current from said source of charging current only after said main storage battery has assumed a predetermined state of charge, thereby protecting the charge of said main storage battery.

20. The power supply system of claim 16, wherein said control means includes monitoring means for providing a control output when a voltage level of said main storage battery is less than a predetermined value and means responsive to said control output to cause said second switching means to disconnect said auxiliary storage battery from said source of charging current.

* * * * *

UNITED STATES PATENT AND TRADEMARK OFFICE
CERTIFICATE OF CORRECTION

PATENT NO. : 5,488,283
DATED : January 30, 1996
INVENTOR(S) : Thomas J. Dougherty et al.

It is certified that error appears in the above-indentified patent and that said Letters Patent is hereby corrected as shown below:

ON THE TITLE PAGE, under Inventors, "Richard J. Johnson" should be --Richard T. Johnson--.

Column 24, line 47, claim 1, "Of" should be --of--.

Column 25, line 29, claim 4, ";" should be --:--.

Column 26, line 34, claim 10, "8" should be --9--.

Column 27, line 60, claim 14, "(1x)" should be --(1-x)--.

Signed and Sealed this

First Day of October, 1996

Attest:

BRUCE LEHMAN

*Attesting Officer*  *Commissioner of Patents and Trademarks*